US009754292B1

United States Patent
Pattan et al.

(10) Patent No.: US 9,754,292 B1
(45) Date of Patent: Sep. 5, 2017

(54) METHOD AND APPARATUS FOR SERVING RELEVANT ADS BASED ON THE RECOMMENDATIONS OF INFLUENTIAL FRIENDS

(75) Inventors: Neha Pattan, Mountain View, CA (US); Jennifer W. Lin, San Jose, CA (US)

(73) Assignee: Google Inc., Mountain View, CA (US)

( * ) Notice: Subject to any disclaimer, the term of this patent is extended or adjusted under 35 U.S.C. 154(b) by 820 days.

(21) Appl. No.: 13/272,852

(22) Filed: Oct. 13, 2011

(51) Int. Cl.
*G06Q 30/02* (2012.01)

(52) U.S. Cl.
CPC ..... *G06Q 30/0269* (2013.01); *G06Q 30/0271* (2013.01); *G06Q 30/0251* (2013.01); *G06Q 30/0255* (2013.01); *G06Q 30/0276* (2013.01); *G06Q 30/0277* (2013.01)

(58) Field of Classification Search
CPC ........ H04L 67/306; H04L 67/22; G06Q 50/01
USPC ........................................................ 705/319
See application file for complete search history.

(56) References Cited

U.S. PATENT DOCUMENTS

| 6,144,944 | A | 11/2000 | Kurtzman, II et al. |
|---|---|---|---|
| 7,707,122 | B2 * | 4/2010 | Hull et al. ..................... 705/319 |
| 7,856,411 | B2 * | 12/2010 | Darr ................................. 706/45 |
| 8,010,418 | B1 | 8/2011 | Lee |
| 8,010,459 | B2 | 8/2011 | Buyukkokten et al. |
| 8,010,460 | B2 | 8/2011 | Work et al. |
| 8,010,602 | B2 * | 8/2011 | Shen et al. .................... 709/204 |
| 8,010,619 | B1 | 8/2011 | Lawler et al. |
| 8,015,119 | B2 * | 9/2011 | Buyukkokten et al. ...... 705/319 |
| 8,051,080 | B2 * | 11/2011 | Kraft ................. G06F 17/30864 707/736 |
| 8,276,079 | B2 * | 9/2012 | Davar ............... G06F 17/30861 715/738 |
| 8,560,605 | B1 * | 10/2013 | Gyongyi ....................... 709/204 |
| 8,763,150 | B2 * | 6/2014 | Flake et al. ..................... 726/27 |
| 2002/0022996 | A1 * | 2/2002 | Sanborn et al. ................ 705/14 |
| 2005/0114526 | A1 | 5/2005 | Aoyama |
| 2005/0171955 | A1 | 8/2005 | Hull et al. |
| 2006/0143067 | A1 * | 6/2006 | Calabria ................ G06Q 10/10 705/26.1 |
| 2008/0040475 | A1 * | 2/2008 | Bosworth et al. ............ 709/224 |
| 2008/0147482 | A1 | 6/2008 | Messing et al. |
| 2008/0195457 | A1 | 8/2008 | Sherman et al. |

(Continued)

OTHER PUBLICATIONS

Facebook Ads & Sponsored Stories (Apr. 2011), retrieved from https://www.facebookstudio.com/fbassets/media/1442/FacebookAdsSponsoredStoriesGuide.pdf.*

(Continued)

*Primary Examiner* — David Stoltenberg
*Assistant Examiner* — Shawn Lillemo
(74) *Attorney, Agent, or Firm* — Fish & Richardson P.C.

(57) ABSTRACT

Methods, apparatuses, and computer-readable media for serving annotations are disclosed. When a contact of a user recommends an ad, the score of the ad may be boosted in an ad auction. The amount of boosting depends on contact affinity. Contacts with greater contact affinity may be more influential, and ads that are recommended by such contacts may have a higher click-through rate. The greater the affinity between the user and contact, the greater the boost to the ad score. Affinity may be measured by a weight value, which is determined by, for example, social network interactions, e-mail/instant messaging communications, and phone logs and contact lists.

14 Claims, 13 Drawing Sheets

(56) References Cited

U.S. PATENT DOCUMENTS

| | | |
|---|---|---|
| 2008/0235078 A1 | 9/2008 | Hong et al. |
| 2008/0262927 A1 | 10/2008 | Kanayama et al. |
| 2008/0288354 A1 | 11/2008 | Flinn et al. |
| 2010/0017279 A1 | 1/2010 | Connor, Jr. |
| 2010/0094840 A1 | 4/2010 | Donnelly et al. |
| 2010/0114704 A1 | 5/2010 | Steelberg et al. |
| 2010/0138294 A1 | 6/2010 | Bussmann et al. |
| 2010/0138413 A1 | 6/2010 | Wu et al. |
| 2010/0161369 A1* | 6/2010 | Farrell et al. ............. 705/8 |
| 2010/0161416 A1 | 6/2010 | Chung et al. |
| 2010/0217670 A1 | 8/2010 | Reis et al. |
| 2010/0228595 A1 | 9/2010 | Dempster et al. |
| 2010/0257023 A1* | 10/2010 | Kendall et al. ............. 705/10 |
| 2010/0268710 A1 | 10/2010 | Strehl et al. |
| 2010/0269058 A1 | 10/2010 | Othmer et al. |
| 2010/0287033 A1* | 11/2010 | Mathur ............. 705/10 |
| 2010/0324990 A1* | 12/2010 | D'Angelo et al. ......... 705/14.46 |
| 2010/0332330 A1* | 12/2010 | Goel et al. ............. 705/14.66 |
| 2011/0029388 A1* | 2/2011 | Kendall et al. ............. 705/14.66 |
| 2011/0082752 A1 | 4/2011 | Dube et al. |
| 2011/0093331 A1 | 4/2011 | Metzler et al. |
| 2011/0093346 A1* | 4/2011 | Lunt et al. ............. 705/14.71 |
| 2011/0153413 A1 | 6/2011 | Chunilal |
| 2011/0196734 A1 | 8/2011 | Anderson et al. |
| 2011/0231240 A1* | 9/2011 | Schoen et al. ............. 705/14.41 |
| 2012/0109757 A1* | 5/2012 | Kendall et al. ............. 705/14.71 |

OTHER PUBLICATIONS

Social Ads Tool, What are Facebook Ads? (May 2011), retrieved from https://web.archive.org/web/20110510152707/http://www.socialadstool.com/facebook-adsguide/ what-are-facebook-ads.*

Cashmore, P., "Google is adding the +1 Button to ads", Google+ https://plus.google.com/s/Google%20is%20adding%20the%20%2B1%20button Downloaded on Oct. 27, 2011. Posted on Sep. 20, 2011.

Oliveria, E., "Google+: 108, the +1 button is coming to display ads", Sep. 20, 2011, http://adwords.blogspot.com/2011/09/google-108-1-button-is-coming-to.html.

Wasserman, T.; "Google +1 Buttons: Coming Soon to Display Ads", Sep. 20, 2011, http://mashable.com/2011/09/20/googles-1-buttons-display-ads Downloaded on Oct. 27, 2011.

* cited by examiner

FIG. 9 SOCIAL DATA TABLE

| User ID | Contact ID | Weight |
|---------|------------|--------|
| Alice   | Bob        | 0.8    |
| Bob     | Alice      | 0.8    |
| Alice   | Carol      | 0.5    |
| Carol   | Alice      | 0.2    |

FIG. 10    RECOMMENDATION DATA TABLE

| User ID | Ad ID | Timestamp |
|---------|-------|-----------|
| Alice   | Ad1   | TS1       |
| Bob     | Ad4   | TS2       |
| Alice   | Ad5   | TS4       |
| Fred    | Ad3   | TS5       |
| Kirk    | Ad2   | TS3       |

METHOD AND APPARATUS FOR SERVING RELEVANT ADS BASED ON THE RECOMMENDATIONS OF INFLUENTIAL FRIENDS

FIELD OF ENDEAVOR

Aspects of the present invention relate to methods, apparatuses, and computer-readable media to serve social annotations and improve the relevance of content being served. Aspects of the invention are useful in a variety of applications, including providing ads that are more relevant and meaningful to users. Specifically, aspects of the present invention relate to storing content recommendations such as ad recommendations made by a user's contacts and boosting, on the basis of contact affinity, the likelihood of serving the recommended content.

BACKGROUND

Internet-based advertising has had varying degrees of success. Advertising such as banner ads may be shown to visitors to a webpage. Banner ads, however, are sometimes ineffective. Ad viewers may ignore the banner ads because the ads are usually not tailored to appeal to the user. Ad viewers might not feel that the ad sends a message that is relevant to them. Because the message of the ad is not considered relevant by ad viewers, the ad suffers from a lower click-through rate. Ad viewers miss an opportunity to obtain a valuable service or product, and the advertiser loses a valuable opportunity to gain a customer.

As recognized by the inventors, increasing the relevance of the overall message of the ad is desired. In one approach, the content of the webpage that a user is viewing is used to choose an ad for a user. However, the message of the ad is still not tailored to appeal to the user. Such an approach only addresses the interests of the user at the moment that the user is viewing the webpage, and may not appeal strongly to the user. In light of such drawbacks, a better approach to delivering an advertising message that more strongly appeals to the user is desired.

SUMMARY

In one aspect of the present invention, the invention may include an apparatus, including: one or more processors, a computer-readable medium coupled to the one or more processors having instructions stored thereon that, when executed by the one or more processors, cause the one or more processors to perform operations including: receiving data indicating a social networking action associated with a user and the user's contact; computing, based on the social networking action, a weight value for the contact with respect to the user; entering the weight value for the contact with respect to the user into a table; receiving an ad request from a client device operated by the user; in response to receiving an ad request from the client device operated by the user, searching for a record from the table that lists a weight of the contact with respect to the user; adjusting ad scores of one or more ads based on the weight; selecting an ad based on the ad scores of the one or more ads; and serving the selected ad to the client device of the user.

In a further aspect of the invention, the computer-readable medium coupled to the one or more processors has further instructions stored thereon that, when executed by the one or more processors, cause the one or more processors to perform further operations including: determining that the social networking action is the user communicating with the contact in a social networking conversation space; and based upon the determining, changing the weight of the contact with respect to the user.

In a further aspect of the invention, the computer-readable medium coupled to the one or more processors has further instructions stored thereon that, when executed by the one or more processors, cause the one or more processors to perform further operations including: determining that the social networking action is the user adding the contact to a social networking contact group; and based upon the determining, changing the weight of the contact with respect to the user.

In a further aspect of the invention, the computer-readable medium coupled to the one or more processors has further instructions stored thereon that, when executed by the one or more processors, cause the one or more processors to perform further operations including: determining that the social networking action is the user sharing an ad with the contact; and based upon the determining, changing the weight of the contact with respect to the user.

In a further aspect of the invention, the computer-readable medium coupled to the one or more processors has further instructions stored thereon that, when executed by the one or more processors, cause the one or more processors to perform further operations including: determining that the social networking action is the user clicking on an ad with an annotation indicating that the user has recommended the ad; and based upon the determining, changing the weight of the contact with respect to the user.

In a further aspect of the invention, the computer-readable medium coupled to the one or more processors has further instructions stored thereon that, when executed by the one or more processors, cause the one or more processors to perform further operations including: determining that the social networking action is the user labeling an image with an identifier representing the contact; and based upon the determining, changing the weight of the contact with respect to the user.

In a further aspect of the invention, the computer-readable medium coupled to the one or more processors has further instructions stored thereon that, when executed by the one or more processors, cause the one or more processors to perform further operations including: determining that the social networking action is the user playing a game with the contact; and based upon the determining, changing the weight of the contact with respect to the user.

In a further aspect of the invention, the computer-readable medium coupled to the one or more processors has further instructions stored thereon that, when executed by the one or more processors, cause the one or more processors to perform further operations including: determining that the social networking action is the user inviting the contact to view a video; and based upon the determining, changing the weight of the contact with respect to the user.

In a further aspect of the invention, the computer-readable medium coupled to the one or more processors has further instructions stored thereon that, when executed by the one or more processors, cause the one or more processors to perform further operations including: determining that the social networking action is the user sharing a photo with the contact; and based upon the determining, changing the weight of the contact with respect to the user.

In a further aspect of the invention, the computer-readable medium coupled to the one or more processors has further instructions stored thereon that, when executed by the one or more processors, cause the one or more processors to perform further operations including: determining that the social networking action is the user identifying the contact having posted a comment and labeling the comment with an identifier identifying the contact; and based upon the determining, changing the weight of the contact with respect to the user.

In a further aspect of the invention, the computer-readable medium coupled to the one or more processors has further instructions stored thereon that, when executed by the one or more processors, cause the one or more processors to perform further operations including: determining that the social networking action is the user choosing to be notified whenever the contact is available for video, voice, or text communication; and, based upon the determining, changing the weight of the contact with respect to the user.

In a further aspect of the invention, the computer-readable medium coupled to the one or more processors has further instructions stored thereon that, when executed by the one or more processors, cause the one or more processors to perform further operations including: determining that the user and the contact have had each other as contacts for a duration of time; and based on the duration of time, changing the weight of the contact with respect to the user.

In a further aspect of the invention, the computer-readable medium coupled to the one or more processors has further instructions stored thereon that, when executed by the one or more processors, cause the one or more processors to perform further operations including: determining that the social networking action is the user notifying the contact that the user will be available in a social networking conversation space; and, based upon the determining, changing the weight of the contact with respect to the user.

In a further aspect of the invention, the computer-readable medium coupled to the one or more processors has further instructions stored thereon that, when executed by the one or more processors, cause the one or more processors to perform further operations including: changing the weight of the contact with respect to the user upon determining that the contact has been added to a social networking contact group that the user has designated as important.

In a further aspect of the invention, the computer-readable medium coupled to the one or more processors has further instructions stored thereon that, when executed by the one or more processors, cause the one or more processors to perform further operations including: changing the weight of the contact with respect to the user based on the volume and/or frequency that the user clicks on ads annotated with the contact's recommendations.

In a further aspect of the invention, the computer-readable medium coupled to the one or more processors has further instructions stored thereon that, when executed by the one or more processors, cause the one or more processors to perform further operations including: changing the weight of the contact with respect to the user according to the proportion of images that are labeled with an identifier for the contact out of the total quantity of images belonging to the user.

In a further aspect of the invention, the computer-readable medium coupled to the one or more processors has further instructions stored thereon that, when executed by the one or more processors, cause the one or more processors to perform further operations including: determining that the social networking action is the user posting a comment on the contact's profile on a social network; and, based upon the determining, changing the weight of the contact with respect to the user.

In a further aspect of the invention, the computer-readable medium coupled to the one or more processors has further instructions stored thereon that, when executed by the one or more processors, cause the one or more processors to perform further operations including: changing the weight of the contact with respect to the user according to the number of shared contacts between the user and the contact.

In a further aspect of the invention, the computer-readable medium coupled to the one or more processors has further instructions stored thereon that, when executed by the one or more processors, cause the one or more processors to perform further operations including: changing the weight of the contact with respect to the user according to the volume and/or frequency that the user and the contact recommend the same ads.

In a further aspect of the invention, the computer-readable medium coupled to the one or more processors has further instructions stored thereon that, when executed by the one or more processors, cause the one or more processors to perform further operations including: changing the weight of the contact with respect to the user based on receiving input from the user indicating that the contact is important.

In a further aspect of the invention, the computer-readable medium coupled to the one or more processors has further instructions stored thereon that, when executed by the one or more processors, cause the one or more processors to perform further operations including: changing the weight of the contact with respect to the user based upon determining that the contact is in a social networking contact group of the user; wherein ads annotated with recommendations from members of the social networking contact group are determined to receive a greater click-through rate at certain days and times.

In a further aspect of the invention, the computer-readable medium coupled to the one or more processors has further instructions stored thereon that, when executed by the one or more processors, cause the one or more processors to perform further operations including: changing the weight of the contact with respect to the user based on the length of an e-mail that the user sends to the contact.

In a further aspect of the invention, the computer-readable medium coupled to the one or more processors has further instructions stored thereon that, when executed by the one or more processors, cause the one or more processors to perform further operations including: changing the weight of the contact with respect to the user based on the volume and/or frequency of e-mail and/or instant messaging communications between the user and the contact.

In a further aspect of the invention, the computer-readable medium coupled to the one or more processors has further instructions stored thereon that, when executed by the one or more processors, cause the one or more processors to perform further operations including: changing the weight of the contact with respect to the user based on the number of people that receive an e-mail sent from the user to the contact.

In a further aspect of the invention, the computer-readable medium coupled to the one or more processors has further instructions stored thereon that, when executed by the one or more processors, cause the one or more processors to perform further operations including: determining that the social networking action is the user inviting the contact to join a chat list of contacts that the user may chat with; and based upon the determining, changing the weight of the contact with respect to the user.

In a further aspect of the invention, the computer-readable medium coupled to the one or more processors has further instructions stored thereon that, when executed by the one or more processors, cause the one or more processors to perform further operations including: determining that the social networking action is the user identifying the contact as having posted a comment and labeling the comment with an identifier identifying the contact; and, based upon the determining, changing the weight of the contact with respect to the user.

In a further aspect of the invention, the computer-readable medium coupled to the one or more processors has further instructions stored thereon that, when executed by the one or more processors, cause the one or more processors to perform further operations including: maintaining a list of contacts sorted by weight value; determining a contact with a greatest weight value from the list; constructing an annotation using information about the contact with the greatest weight value; and sending the annotation to the client for display on the client.

In a further aspect of the invention, constructing the annotation using the contact with the greatest weight value further comprises constructing the annotation by adding information about one or more additional contacts from the list.

In another aspect of the present invention, the invention may include an apparatus including: one or more processors, a computer-readable medium coupled to the one or more processors having instructions stored thereon that, when executed by the one or more processors, cause the one or more processors to perform operations including: receiving data indicating that a user is communicating with a contact; computing, based on the communication, a weight value for the contact with respect to the user; entering the weight value for the contact with respect to the user into a table; receiving an ad request from a client device operated by the user in response to receiving an ad request from the client device operated by the user, searching for a record from the table that lists a weight of the contact with respect to the user; increasing ad scores of one or more ads associated with the contact; selecting an ad based on the ad scores of the one or more ads; and serving the selected ad to the client device of the user.

In a further aspect of the invention, the computer-readable medium coupled to the one or more processors has further instructions stored thereon that, when executed by the one or more processors, cause the one or more processors to perform further operations including: storing data indicating a frequency and/or volume of communications between the user and the contact; and computing the weight value using the data.

In yet another aspect of the present invention, the invention may include a method performed by a data processing apparatus, including: receiving data indicating a social networking action associated with a user and the user's contact; computing, based on the social networking action, a weight value for the contact with respect to the user; entering the weight value for the contact with respect to the user into a table; receiving an ad request from a client device operated by the user; in response to receiving an ad request from the client device operated by the user, searching for a record from the table that lists a weight of the contact with respect to the user; adjusting ad scores of one or more ads based on the weight; selecting an ad based on the ad scores of the one or more ads; serving the selected ad to the client device of the user.

In a further aspect of the invention, the method may further include: determining that the social networking action is the user communicating with the contact in a social networking conversation space; and based upon the determining, changing the weight of the contact with respect to the user.

In a further aspect of the invention, the method may further include: determining that the social networking action is the user adding the contact to a social networking contact group; and based upon the determining, changing the weight of the contact with respect to the user.

In a further aspect of the invention, the method may further include: determining that the social networking action is the user sharing an ad with the contact; and based upon the determining, changing the weight of the contact with respect to the user.

In a further aspect of the invention, the method may further include: determining that the social networking action is the user clicking on an ad with an annotation indicating that the user has recommended the ad; and based upon the determining, changing the weight of the contact with respect to the user.

In a further aspect of the invention, the method may further include: determining that the social networking action is the user labeling an image with an identifier representing the contact; and based upon the determining, changing the weight of the contact with respect to the user.

In a further aspect of the invention, the method may further include: determining that the social networking action is the user playing a game with the contact; and based upon the determining, changing the weight of the contact with respect to the user.

In a further aspect of the invention, the method may further include: determining that the social networking action is the user inviting the contact to view a video; and based upon the determining, changing the weight of the contact with respect to the user.

In a further aspect of the invention, the method may further include: determining that the social networking action is the user sharing a photo with the contact; and based upon the determining, changing the weight of the contact with respect to the user.

In a further aspect of the invention, the method may further include: determining that the social networking action is the user identifying the contact having posted a comment and labeling the comment with an identifier identifying the contact; and based upon the determining, changing the weight of the contact with respect to the user.

In a further aspect of the invention, the method may further include: determining that the social networking action is the user choosing to be notified whenever the contact is available for video, voice, or text communication; and, based upon the determining, changing the weight of the contact with respect to the user.

In a further aspect of the invention, the method may further include: determining that the user and the contact have had each other as contacts for a duration of time; and based on the duration of time, changing the weight of the contact with respect to the user.

In a further aspect of the invention, the method may further include: determining that the social networking action is the user notifying the contact that the user will be available in a social networking conversation space; and, based upon the determining, changing the weight of the contact with respect to the user.

In a further aspect of the invention, the method may further include: changing the weight of the contact with respect to the user upon determining that the contact has been added to a social networking contact group that the user has designated as important.

In a further aspect of the invention, the method may further include: changing the weight of the contact with respect to the user based on the volume and/or frequency that the user clicks on ads annotated with the contact's recommendations.

In a further aspect of the invention, the method may further include: changing the weight of the contact with respect to the user according to the proportion of images that are labeled with an identifier for the contact out of the total quantity of images belonging to the user.

In a further aspect of the invention, the method may further include: determining that the social networking action is the user posting a comment on the contact's profile on a social network; and, based upon the determining, changing the weight of the contact with respect to the user.

In a further aspect of the invention, the method may further include: changing the weight of the contact with respect to the user according to the number of shared contacts between the user and the contact.

In a further aspect of the invention, the method may further include: changing the weight of the contact with respect to the user according to the volume and/or frequency that the user and the contact recommend the same ads.

In a further aspect of the invention, the method may further include: changing the weight of the contact with respect to the user based on receiving input from the user indicating that the contact is important.

In a further aspect of the invention, the method may further include: changing the weight of the contact with respect to the user based upon determining that the contact is in a social networking contact group of the user; wherein ads annotated with recommendations from members of the social networking contact group are determined to receive a greater click-through rate at certain days and times.

In a further aspect of the invention, the method may further include: changing the weight of the contact with respect to the user based on the length of an e-mail that the user sends to the contact.

In a further aspect of the invention, the method may further include: changing the weight of the contact with respect to the user based on the volume and/or frequency of e-mail and/or instant messaging communications between the user and the contact.

In a further aspect of the invention, the method may further include: changing the weight of the contact with respect to the user based on the number of people that receive an e-mail sent from the user to the contact.

In a further aspect of the invention, the method may further include: determining that the social networking action is the user inviting the contact to join a chat list of contacts that the user may chat with; and based upon the determining, changing the weight of the contact with respect to the user.

In a further aspect of the invention, the method may further include: determining that the social networking action is the user identifying the contact as having posted a comment and labeling the comment with an identifier identifying the contact; and, based upon the determining, changing the weight of the contact with respect to the user.

In a further aspect of the invention, the method may further include: maintaining a list of contacts sorted by weight value; determining a contact with a greatest weight value from the list; constructing an annotation using information about the contact with the greatest weight value; and sending the annotation to the client for display on the client.

In a further aspect of the method of the invention, constructing the annotation using the contact with the greatest weight value further comprises constructing the annotation by adding information about one or more additional contacts from the list.

In a further aspect of the invention, the invention includes a method performed by a data processing apparatus, including: receiving data indicating that a user is communicating with a contact; computing, based on the communication, a weight value for the contact with respect to the user; entering the weight value for the contact with respect to the user into a table; receiving an ad request from a client device operated by the user; in response to receiving an ad request from the client device operated by the user, searching for a record from the table that lists a weight of the contact with respect to the user; increasing ad scores of one or more ads associated with the contact; selecting an ad based on the ad scores of the one or more ads; serving the selected ad to the client device of the user.

In a further aspect of the invention, the method may further include: storing data indicating a frequency and/or volume of communications between the user and the contact; and computing the weight value using the data.

Further scope of applicability of the methods, apparatuses, and computer-readable storage mediums discussed will become apparent from the detailed description given hereinafter. However, it should be understood that the detailed description and specific examples, while indicating embodiments, are given by way of illustration only, since various changes and modifications within the spirit and scope of the concepts disclosed herein will become apparent to those skilled in the art from this detailed description.

BRIEF DESCRIPTION OF THE DRAWINGS

The systems and methods discussed will become more fully understood from the detailed description given herein below and the accompanying drawings which are given by way of illustration only, and thus are not limitative, and wherein:

FIG. 9 illustrates a social data table, according to an embodiment.

FIG. 10 illustrates a recommendation data table, according to an embodiment.

Figure 1:
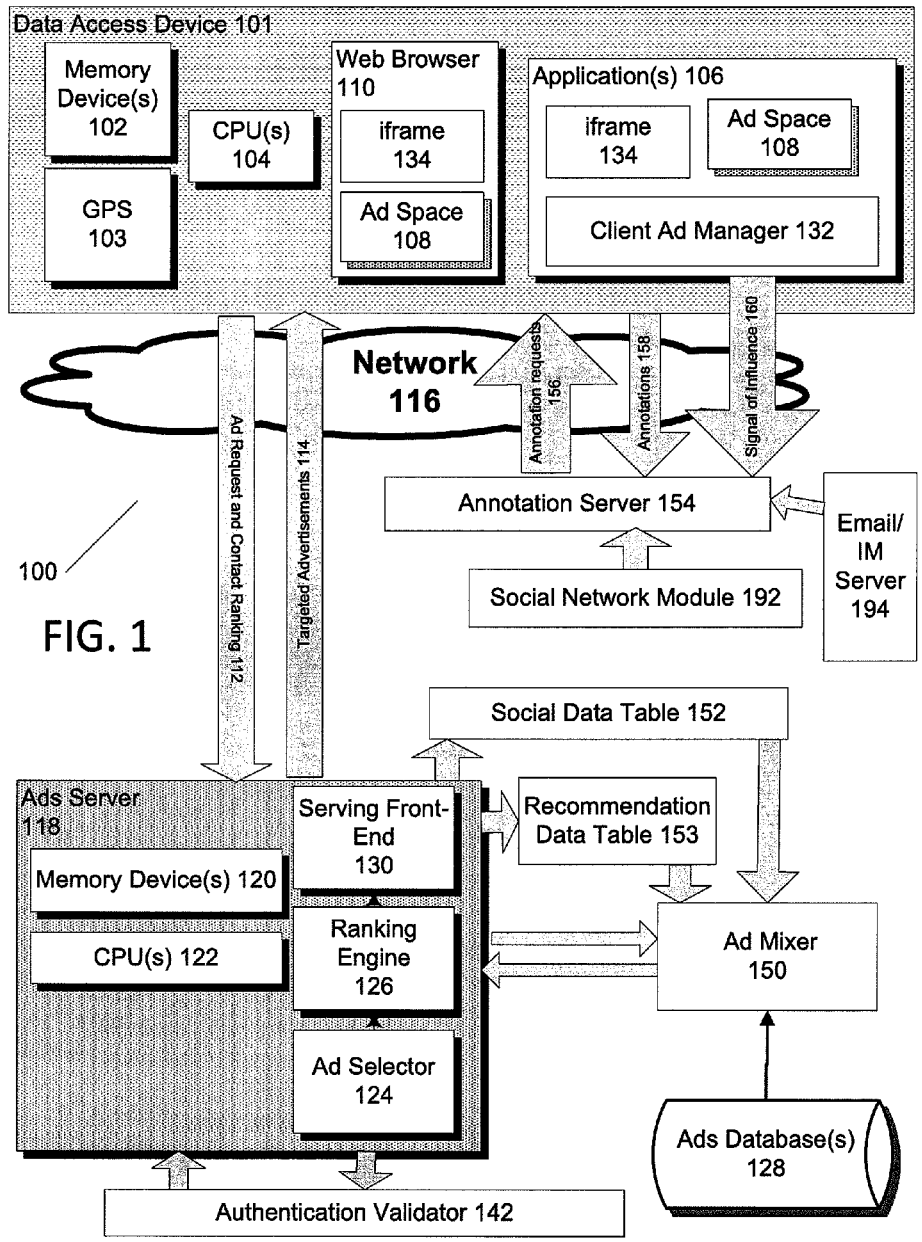
FIG. 1 is a block diagram illustrating a social annotation system in which ads with annotations regarding recommendations made by a user's contacts are boosted by contact affinity, according to an embodiment.

The drawings will be described in detail in the course of the detailed description.

DETAILED DESCRIPTION

The following detailed description refers to the accompanying drawings. The same reference numbers in different drawings identify the same or similar elements. Also, the following detailed description does not limit the concepts discussed. Instead, the scope of the concepts discussed herein is defined by the appended claims and equivalents thereof.

Introduction

An ad displayed to a user on a device may be presented with an annotation. An annotation may be a communication indicating a recommendation previously made for the ad. Usually the recommendation is made by a social contact in the social graph of the person viewing the ad (hereafter "user"). The annotations may be written over or included within the ad. The annotations may be of the form social contact(s)+"recommended this ad". The annotation indicates the recommendation made by the social contact(s). For example, an annotation may be "Alice recommended this ad", where "Alice" is the name of a social contact of the user.

A social contact is an acquaintance of the user, and the user's social contacts may be recorded in a table in a storage. More than one social contact may be shown in the annotation. For example, the annotation may display as "Alice, Jill, and Bob recommended this ad". In some embodiments, an image that is a photo or avatar of the social contact may be displayed with the annotation. In some embodiments, photos or avatars may be displayed in place of the names.

In an embodiment, the ad and annotation may be chosen on the basis of contact affinity. Ads associated with recommendations made by social contacts who share a strong contact affinity with the user have a higher chance of being displayed to the user. "Contact affinity" means a measure of a bond between two people. "Contact affinity" generally reflects the frequency and/or volume of interactions between two people or actions by one person that are associated with contacts, taking into account the nature of the interactions or actions. Having stronger contact affinity generally means that one person has greater influence over the other in comparison to other people. As used herein, for simplicity of description, an "interaction" between two people may also refer to or include an "action" taken by one person that is associated with another person, who may be a contact.

In one embodiment, the score of an ad is boosted if the ad is recommended by a contact who shares a high social affinity with the user. In some embodiments, the score of an ad is boosted in proportion to the social affinity shared between the user and the contact. In such embodiments, ads that are recommended by contacts who have greater influence over a user are served to the user.

In one embodiment, social affinity may be measured by a weight value. The weight value may be associated with each user-contact pair. For example, Bob and Alice call each other frequently and therefore share a weight value of 0.8. Alice sometimes calls Carol and therefore Carol has a weight of 0.5 with respect to Alice. However, Carol rarely calls Alice and therefore Alice has a weight of 0.2 with respect to Carol. This is illustrated in the social data table 900 of FIG. 9.

In an embodiment, the weight value may be affected by a "signal of influence" that is used as input to compute the weight value. In some embodiments, the signal of influence is a communication expressing that A performed X with B, with Y parameters. For example, a signal of influence may be Alice called Bob for two hours in the last week. In this example, A=Alice, X=call, B=Bob, and Y=2 hours. In an embodiment, the elements that make up the signal of influence are [source ID, destination ID, action, parameters]. Source ID is the person that performed the action. Destination ID is the recipient of the action. Action may be, for example, calling someone, sending a text message to someone, or adding someone to a social networking contact group.

In some embodiments, the signal of influence may be any of the following: 1) a ranked listing of contacts 2) social network interaction data, and/or 3) e-mail/instant messaging communication. The signal of influence may also be any other data that may be used to modify the weight value.

In some embodiments, a ranked listing of contacts from a user or a contact of the user may be used to modify weight values. The ranked listing of contacts may be constructed based on a listing of contacts from a mobile phone or some other device. In some embodiments, communication volume and/or frequency between the user and the contact may also be used to create the ranking of contacts or used in combination with the ranked listing of contacts to modify weight values. In some embodiments, the weight value may be determined by the frequency that the user views the contact's information, or by the frequency with which the user texts the contact, or some combination of calls, texts, and views.

In some embodiments, social network interaction data may be used to modify weight values. A "social network" is a social structure between two or more people. The social network may be represented online with each person having an online account. The people on the social network may interact with each other. A "social network interaction" (or "social network action") is any kind of interaction between two or more people from the social network or action performed by one person that is associated with a contact. Some examples of social network interactions are two or more people in a group videoconference, two or more people playing online games together, and one person inviting the other to view photos. Social network interactions also include other activities that are not explicitly listed or described herein. The nature and volume and/or frequency of such social network interactions may be used to determine weight values or modify weight values.

In some embodiments, e-mail/instant messaging communication may be used to modify weight values. One way to measure social affinity and the influence that one person has over another is the communications sent between the two people. In some embodiments, when one person sends an e-mail communication to another, the recipient of the e-mail may have her weight value increased with respect to the sender of the e-mail. In some embodiments, when two people spend a great amount of time chatting with each other using instant messaging, the weight value of each person with respect to the other may be increased. Other embodiments also may modify weight values based on the different communications between people.

In some embodiments, for two people, the social affinity with the first person as a user and the second person as the contact may be different from the social affinity with the second person as the user and the first person as the contact. Such a situation may occur, for example, when the first person calls the second person often, but the second person does not call the first person often.

In some embodiments, an annotation is constructed on the basis of social affinity between a user and a contact, and the annotation is displayed with the ad. An ad with a boosted score may be annotated using recommendations from contacts that are the most influential. These contacts may have the highest weights with respect to the user. Because the ad is annotated using the name(s) of one or more of the most influential social contacts of the user, the message of the ad with the annotations, as a whole, more strongly appeals to the user. The boosting of ad scores and construction of relevant annotations increases the relevance of the ad and annotation combination to the user. The annotations are constructed and served to applications and web browsers by a social annotation system such as the social annotation system described with respect to FIG. 1 below.

Structural Overview

FIG. 1 is a block diagram illustrating a social annotation system 100 in which ads with annotations regarding recommendations made by a user's contacts are boosted by contact affinity, according to an embodiment. The annotations may be served to an application or a web browser, in response to a request for an ad from the application or the web browser. FIG. 1 illustrates modules of the social annotation systems and some of the communications sent between the modules when an ad request is received from an application or from a web browser.

An embodiment of a mobile data access device 101 which is operated by the user may include a mobile telephone, a mobile handheld device, a media tablet device, netbook, notebook computer, GPS device, media player device, or some combination thereof or variation thereof. Mobile data access device 101 is hereafter referred to as "client" 101.

Client 101 may include one or more memory devices 102 for storing applications, application data, webpages, images, audio and/or video, device settings and/or preferences, and other information relevant to the operation, use, and potential user(s) of the device. Client 101 may also include one or more processors 104 to process the information and execute the applications stored in the memory device(s) 102. Variations of memory 102 and processor 104 devices may include magnetic, electronic, and/or optical devices and/or combinations thereof.

Some variations of client 101 may include a display screen (not shown) and/or a speaker (not shown). Other variations of a client may include signal output paths such as wired or wireless connections to external audio and/or video devices such as docking stations, earphones, near field communication devices, external displays, and other similar information presentation devices. Client 101 may also include a global positioning system (GPS) unit 103. The GPS unit 103 allows various applications and modules executing on client 101 to obtain data indicating the physical location of the user. Although at any given moment a user may be separated from a client device by a distance, for the purposes of the specification, the location of the client device and the user operating the client device may be considered to be the same.

Client 101 may include one or more applications 106. Some variations of applications 106 may include designated ad space 108 for the display of advertisements related to an application or the content/information presented or processed therein. Client 101 may also include one or more web browser tools 110 for viewing and interacting with webpages via a wired or wireless internet connection and/or via a mobile data exchange connection such as cellular, optical, near field communication, or some combination thereof. Some variations of a web browser 110 may also include a designated ad space 108 for the display of advertisements related to webpage content, search results, web-based email, map information, and/or geo-temporal factors. In some embodiments, the web browser 110 is an application that is one example of application 106. In such embodiments, web browser 110 operates in a manner similar to other applications with respect to various embodiments of the invention.

Client 101 may submit advertisement requests 112 and receive served advertisements 114 via a communication network 116 such as the internet, a public, private, wired, and/or wireless local area network (LAN) or wide area network (WAN), a cellular communication network, telephone lines, radio-frequency networks, hard-wired connections, and/or combinations thereof. The ad requests 112 and served advertisements 114 may go to and from an ads server 118. In some embodiments, the ad request 112 may include encrypted identification information. The encrypted identification information may be a limited ID cookie, which is a cookie containing an encrypted unique identifier for the user. In some embodiments, the encrypted identification information may also be a non-limited identification cookie containing an encrypted unique identifier for the user. In yet other embodiments, the encrypted identification information may be an identifier that is encrypted. In some embodiments, the ad request may also include a contact ranking. In some embodiments, the advertisements 114 may include annotations which are sent to client 101 for display. In some embodiments, the served ads 114 are sent over HTTP and the annotations are served over a secure HTTP connection (HTTPS).

An embodiment of an ads server 118 may be equipped with one or more memory devices 120 for storing information and one or more processors 122 for performing data processing operations. The embodiment shown is also equipped with an ad selector 124 and an optional ranking engine 126 that selects and optionally ranks ads from an ads database 128, and a serving frontend 130 that delivers the advertisement via network 116 to client 101.

In some embodiments, a client ad manager 132 may be compiled with the application 106 and become embedded within application 106. Client ad manager 132 thus may form an integral part of application 106. The client ad manager 132 manages advertising for application(s) 106, including sending requests for advertisements to ads server 118 and receiving ads from ads server 118. In other embodiments, client ad manager 132 may not be part of application 106, and may be part of web browser 110, or may be a separate module or component of client 101. In some embodiments, client ad manager 132 also manages advertising for web browser 110.

In some embodiments, application(s) and/or web browser 110 includes an iframe 134 sent from ads server 118. The iframes depicted in FIG. 1 form part of an embodiment in which ads server 118 sends an iframe 134 to client 101 in response to an ad request. The iframe 134 requests annotations and receives annotations for display to the user.

Ads server 118 may send the encrypted identification information to an authentication validator 142 to obtain user IDs. In an embodiment, a user ID is a unique value that identifies a user or a social contact in a social network. For example, the user ID may be a long integer. The user ID may be the social networking ID of the user or social contact. No two users or social contacts may have the same user ID.

One such example of encrypted identification information is the limited ID cookie. The limited ID cookie is a cookie, created by a limited ID cookie generator server, that contains an encrypted social networking ID (such as the user ID) from the user's social networking account. Each limited ID cookie is an encrypted cookie containing user ID data. Client 101 may store a copy of limited ID cookie received from a limited ID cookie generator server (not depicted in FIG. 1). The limited ID cookie is considered "weak" because the limited ID cookie cannot be decrypted by other third party services or applications and can be used only for social ad targeting. In some embodiments, the limited ID cookie may be used to keep track of user presence in social networks. The limited ID cookie may also include a timestamp and have a limited lifetime.

In some embodiments, as a security measure, only a specially designated server, authentication validator 142, may decrypt the limited ID cookie and retrieve the user ID that is stored inside the limited ID cookie. If an unauthorized party gains access to the limited ID cookie, the potential harm to the user is limited to social ad targeting using the social networking ID. Through the use of the limited ID cookies, the use of a more generalized, non-limited identification cookie that may allow for all types of access and transactions for the user is unnecessary for serving annotations. Thus, the user need not expose other more powerful social networking identification cookies, and because the limited ID cookie is only useful for social ad targeting and may expire, the damage that may occur due to unauthorized access of the limited ID cookie is limited. In other embodiments, authentication validator 142 may decrypt any encrypted identification information.

An embodiment may include an ad mixer 150 that selects an ad to send to ads server 118. In some embodiments, ad mixer 150 may be part of ads server 118. In some embodiments, the functions of ad mixer 150 may be implemented within ranking engine 126 and/or ad selector 124. In some embodiments, ad mixer 150 retrieves records from a social data table 152, and a recommendation data table 153 to boost ads in ads scoring on the basis of social affinity. One or more modules or components may log recommendation indicators such as recommendation data records into the recommendation data table. In some embodiments, the ad that ad mixer 150 selects for sending to ads server 118 may be affected by information retrieved from the social data table 152 and recommendation data table 153.

An embodiment may also include authentication validator 142. In some embodiments, ad server 119 may send encrypted identification information to authentication validator 142, and receive a user ID from authentication validator 142. In some embodiments, the encrypted identification information is a limited ID cookie. Authentication validator 142 decrypts the encrypted identification information and provides the user ID that is stored in the encrypted identification information to ads server 118. In some embodiments, authentication validator 142 decrypts the encrypted identification information and provides the user ID that is stored in the encrypted identification information to any module or other requester that requests the user ID.

An embodiment may also include an annotation server 154. Annotation server 154 constructs and serves annotations to client 101. When ads server 118 receives a request from client 101, in an embodiment, ads server 118 sends an ad and an iframe 134 to client 101. The iframe 134 is installed on client 101, on the application or web browser that requested the ad.

Iframe 134 sends annotation requests 156 to annotation server 154. Annotation server 154 retrieves records from the social data table 152 and recommendation data table 153 to construct annotations 158 that are sent to client 101. In some embodiments, annotation server 154 may receive a signal of influence 160 from client ad manager 132. Annotation server 154 may use the signal of influence 160 in order to modify weights of contacts and users.

An embodiment may also include a social network module 192. The social network module 192 communicates with the annotation server 154 in order to allow the user to perform social network interactions with contacts. Annotation server 154 may use information about social network interactions in order to modify weights of contacts and users. Social network module 192 may send a signal of influence to annotation server 154.

An embodiment may also include an e-mail/instant messaging server 194. Server 194 may send a signal of influence to annotation server 154. Server 194 processes e-mail and instant messaging communications for the user and contacts. Server 194 may also send information about the user's communications with contacts to annotation server 154. Annotation server 154 may use such information to modify weights of contacts and users. In some embodiments, e-mail/instant messaging server 194 may send the information about the user's communications with contacts to social network module 192. Annotation server 154 may then use the user's communication information to modify weights.

Some modules or communications that may be present in the embodiments of FIG. 1 are not depicted in the figures for simplicity of illustration. For example, one or more cron jobs are not depicted in the figures.

Functional Overview

In an embodiment, in social annotation system 100, recommendation records and/or social data records are created when a user recommends an ad. Any one of or any combination of the records may be used to boost ads and construct annotations according to contact affinity.

In an embodiment, a social network module may communicate a signal of influence to the annotation server. The annotation server may use the signal of influence to compute weights for one or more contacts with respect to a user. The weights may be stored in a social data table and used for boosting ad scores and for constructing annotations.

In an embodiment, an e-mail/instant messaging server may communicate a signal of influence to the annotation server. The annotation server may use the signal of influence to compute weights for one or more contacts with respect to a user. The weights may be stored in a social data table and used for boosting ad scores and for constructing annotations.

In an embodiment, an e-mail/instant messaging server may compute a list of most influential contacts and send the list to the annotation server. The annotation server may compute weights based on the received list. The weights may be stored in a social data table and used for boosting ad scores and for constructing annotations.

In an embodiment, a ranked contact list may be formed at a client and sent with an ad request to an ads server. The contact ad manager may send a ranked contact list and/or call, text message, and view history data to ads server 118. In such embodiments, ads server 118 may compute weights for ranked contacts and store such weight values. In other embodiments, ads server 118 may forward the ranked contact information and history information to the annotation server for weight computations and storage of the weights.

In an embodiment, for contact affinity boosting, ads server 118 uses the social data to boost the scores of those ads that were recommended by a person who is a contact of the user. In some embodiments, multiple ads may be boosted based on contact affinity.

The terms "advertisement" and "ad" are interchangeable as used in the present patent specification. The terms "identification" and "ID" are interchangeable as used in the present patent specification.

Figure 2:
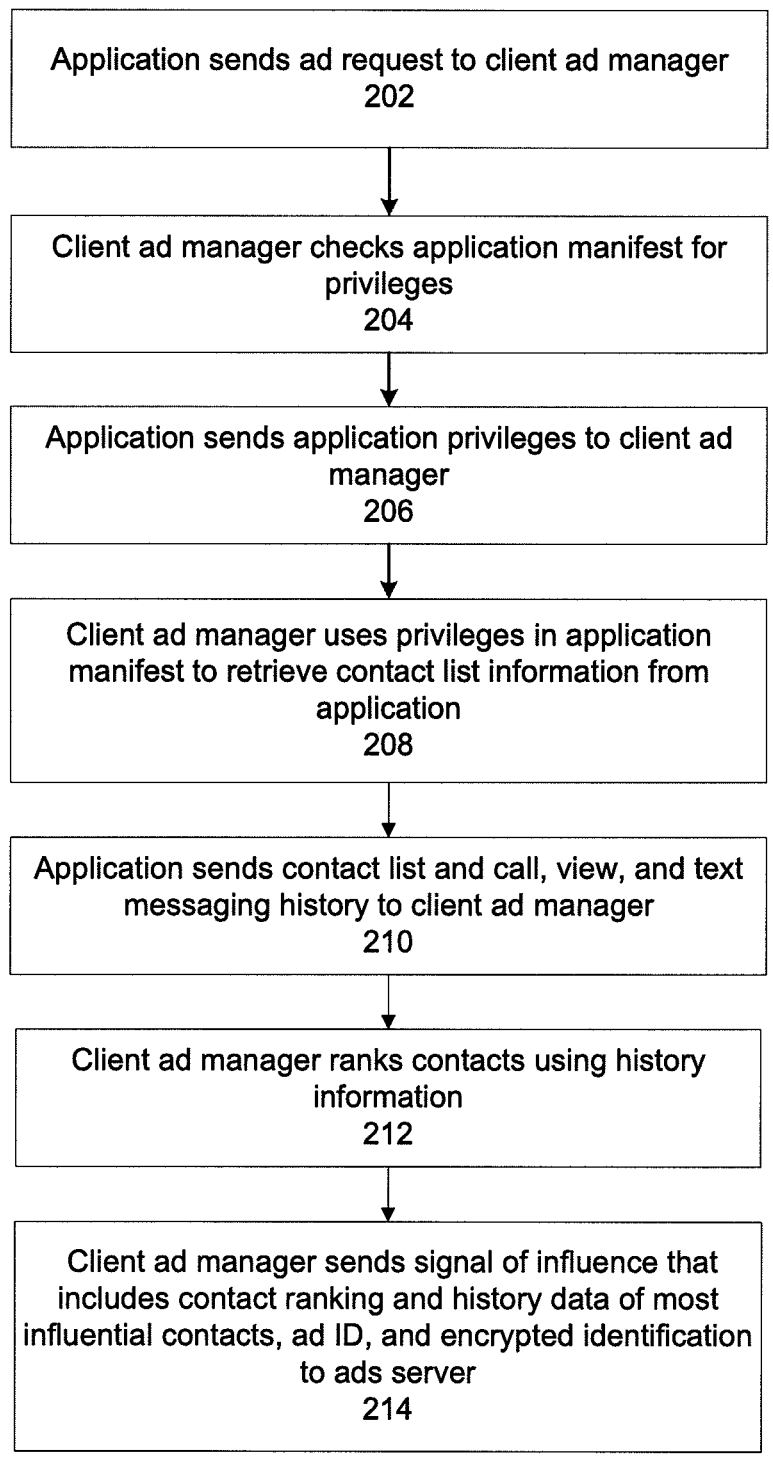
FIG. 2 is a flow diagram illustrating forming a ranked contact list at the client when sending the list and an ad request to an ads server, according to an embodiment.

Forming a Ranked Contact List at the Client when Sending the List and an Ad Request to an Ads Server FIG. 2 is a flow diagram illustrating forming a ranked contact list at the client when sending the list and an ad request to an ads server, according to an embodiment.

In step 202, application sends an ad request to client ad manager 132. Client ad manager 132 manages sending requests to ads server 118 for ads and receives the ads from ads server 118.

In step 204, client ad manager 132 checks application manifest for privileges. The client ad manager checks whether the application has the requisite access privileges in order to access call, view, and text messaging history data.

In step 206, application sends application privileges to client ad manager 132. The client ad manager must receive the application privileges in order to retrieve contact and history information.

In step 208, client ad manager 132 uses privileges in the application manifest to retrieve contact list information from an application. The contact list information may list friends of the user, and may also include the volume and/or frequency of communications with the friends. Client ad manager 132 may retrieve communication history such as the call, view, and text messaging history, including call frequency. In some embodiments, client ad manager may send a request to a contacts application for contact and history information. In some embodiments, an application programming interface may be used on some platforms to enable calling routines that retrieve the name, e-mail address, call history, and other information of contacts. In some embodiments, the call history may be read from a database.

In step 210, application sends the contact list and call, view, and text messaging history to client ad manager 132. The contact data may include the frequency of calls, texts, or views of contacts from a contact application. Such a contact application may be, for example, a personal phone book directory for a phone application. In an embodiment, the application sends an intent to the Web browser with a contact and history information. A client ad manager in a Web browser can access the contact and history information received by the Web browser.

In step 212, client ad manager 132 ranks the contacts using the history information. Client ad manager 132 may use an algorithm that ranks the contacts. In an embodiment, an algorithm may rank the contacts according to the frequency of calls made within the past three months. In another embodiment, an algorithm may rank the contacts according to the total number of times that a user spends on phone calls with each contact. In another embodiment, client ad manager 132 may use an algorithm to rank the contacts according to the most recently contacted contacts. Client ad manager 132 may use any combination of history information in order to rank the contacts.

In step 214, client ad manager 132 sends a signal of influence that includes contact ranking and the history data of the most influential contacts, ad ID, and encrypted identification information to ads server 118. The ranking of contacts that is computed in step 212 may be sent to the ads server. In some embodiments, client ad manager 132 sends only the top ranked contacts to the ads server. For example, client ad manager 132 may send the top 10 ranked contacts, out of a total of 15 ranked contacts, to the ads server. Client ad manager 132 may also send encrypted identification information and the history data that includes call, view, and text messaging history to ads server 118.

Providing an Annotated Ad in Response to an Ad Request

Figure 3A:
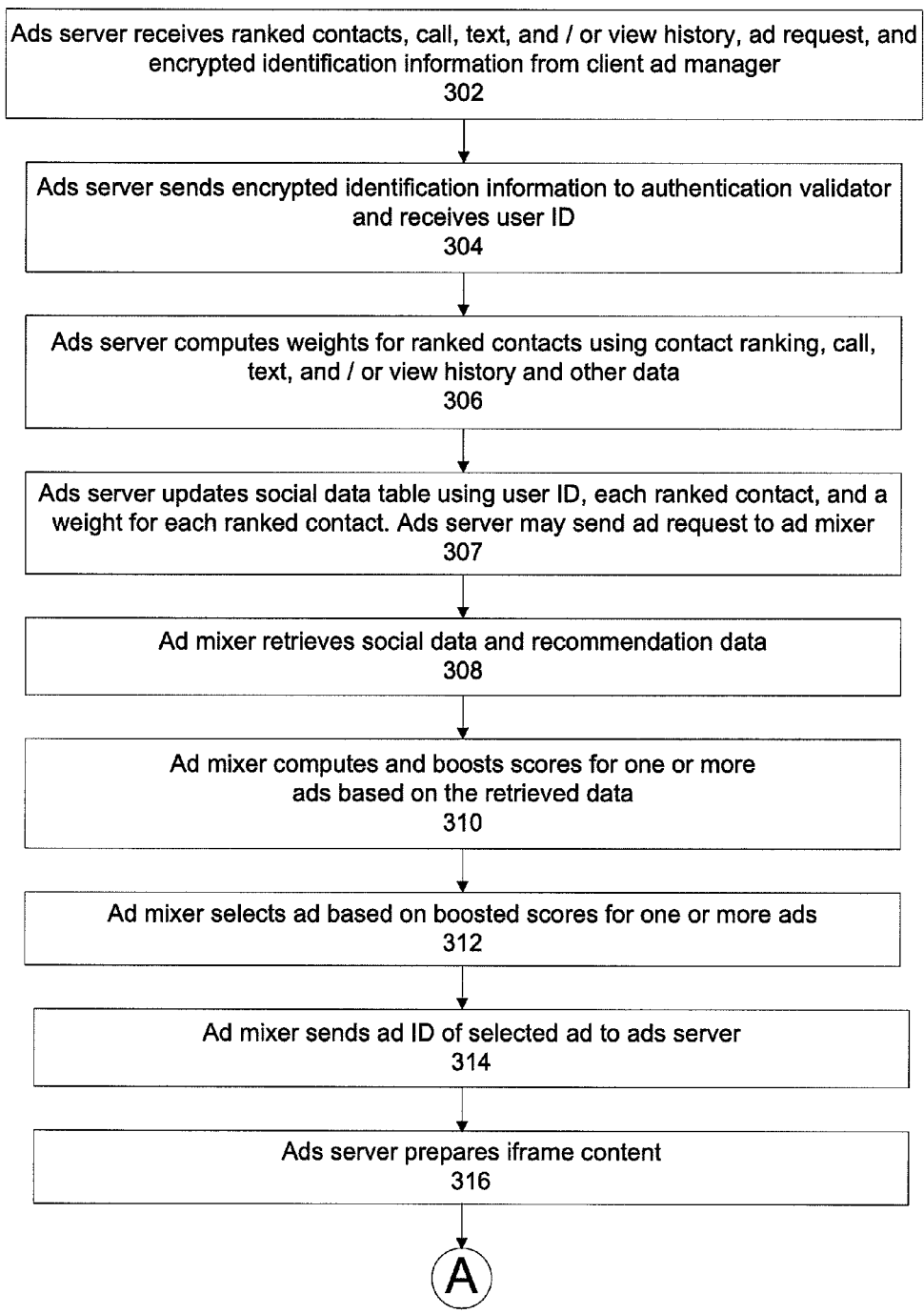
FIGS. 3a and 3b together form a flow diagram illustrating providing an annotated ad in response to an ad request, according to an embodiment.
Figure 3B:
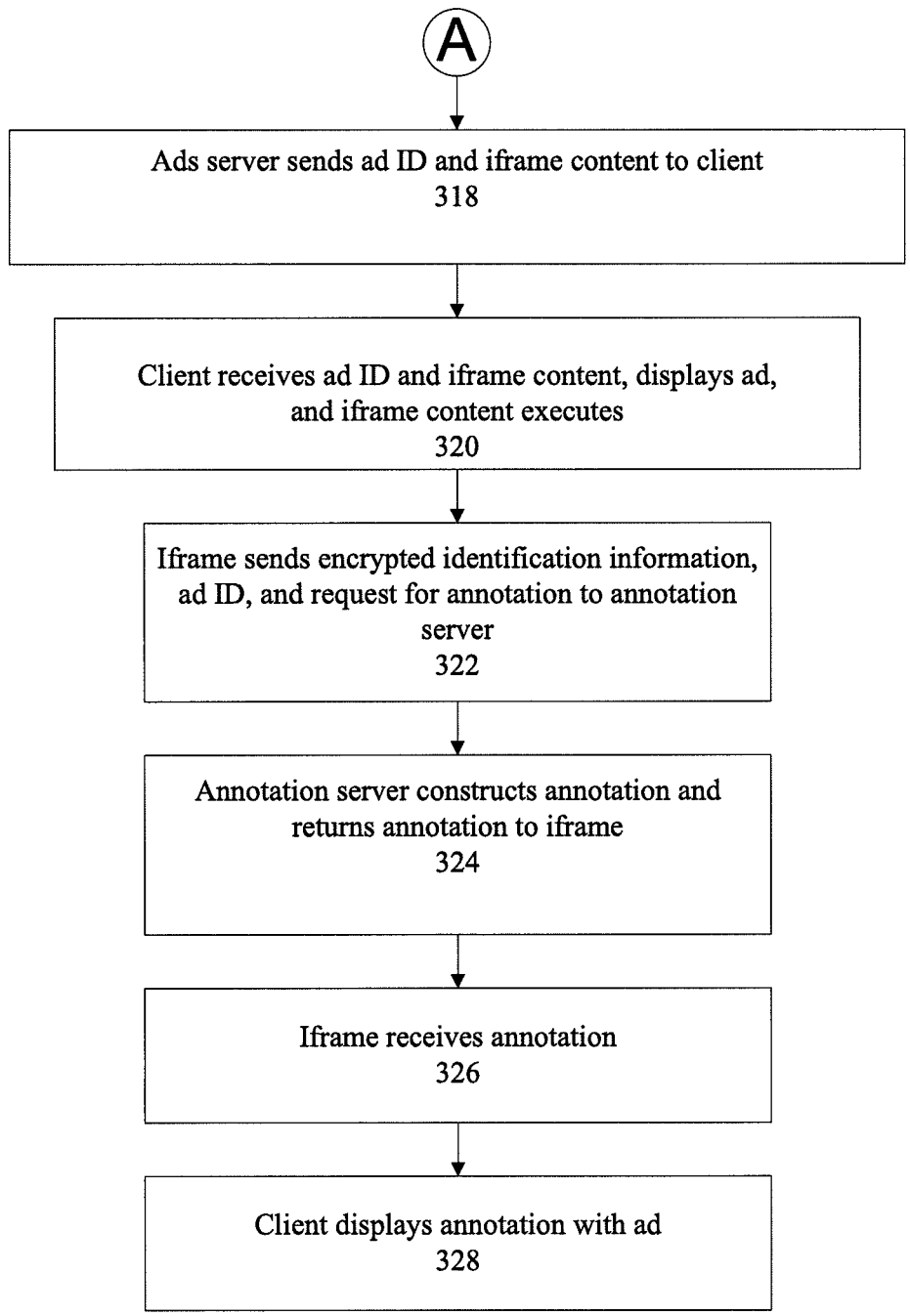

FIGS. 3*a* and 3*b* together form a flow diagram illustrating providing an annotated ad in response to an ad request, according to an embodiment.

In step 302, ads server 118 receives ranked contacts, call, text, and/or view history, ad request, and encrypted identification information from client ad manager 132. The ranked contacts and history data are optionally not received in some embodiments. In an embodiment, the encrypted identification information is a limited ID cookie. In some embodiments, the encrypted identification information is a non-limited identification cookie or some other identifier. Client ad manager 132 manages sending ad requests to ads server 118 and receiving ad requests from ads server 118. The limited ID cookie contains an encrypted user ID that identifies the user that will be viewing the ad received from ads server 118.

In some embodiments, client ad manager 132 may encrypt and send ranked contacts and call, text, and view history of the user to either the ads server 118 or a front end module (not depicted in FIG. 1). The front end module or ads server 118 may decrypt the encrypted information and write the information into a log file. A cron job can read the logs and compute weights for the social data table.

In step 304, ads server 118 sends encrypted identification information to authentication validator 142 and receives a user ID. In some embodiments, ads server 118 sends the limited ID cookie or the non-limited identification cookie to the authentication validator 142. In some embodiments, authentication validator 142 is the only module with the capability to decrypt the encrypted identification information and extract the user ID. This adds a level of protection to the security of the encrypted identification information.

In step 306, in some embodiments, ads server 118 computes weights for ranked contacts using contact ranking, call, text, and/or view history and other data. In some embodiments, if ads server 118 does not receive ranked contacts or history data, then ads server 118 does not compute weights at this step.

In some embodiments, ads server 118 may increase the weight of a contact associated with the user ID based on the ranking of the contact received from client ad manager 132. In some embodiments, if the contact is at the top of the ranking, then the weight increase may be the greatest increase compared to the increase for the other contacts. For example, if the weight of the contact is 0.2, and the contact is at the top of the list of ranked contacts, then the weight of the contact may be increased to 0.9. In some embodiments, if the contact is at the bottom of the ranking received from client ad manager 132, then the weight increase may be minimal compared to the increase for the other contacts. For example, if the weight of the contact is 0.3, and the contact is near the bottom of the ranking, then the weight may be increased to 0.4. In some embodiments, the weight of the contact may also be decreased in some circumstances. For example, if the weight of the contact is 0.9, and the contact is near the bottom of the list of ranked contacts, then the weight of the contact may be decreased to 0.2.

In some embodiments, the call, view, and/or text history of the user and contact may be used to determine or update the weight value. The use of the history information to update or determine the weight value is discussed in detail with respect to FIG. 9. The calculated weights may be stored in social data table 152.

In step 307, in some embodiments, ads server 118 updates social data table using user ID, each ranked contact, and a weight for each ranked contact. Ads server 118 may send an ad request to ad mixer 150. The ads server may create a social data record using the user ID, contact ID of the ranked contact, and the weight. The ads server then enters the record into the social data table. In some embodiments where weight values are not computed in step 306, ads server 118 does not update the social data table in this step.

In step 308, ad mixer 150 retrieves social data and recommendation data. Ad mixer 150 retrieves the data from the social data table 152 and recommendation table. Some of the data retrieval may be performed by ad mixer 150 as part of step 310, during the computing and score boosting process. The data may also be retrieved and cached for computation at ad mixer 150, in order to increase performance for step 310. In an embodiment, ad mixer 150 retrieves only recommendation records associated with contacts of the user. FIG. 10 provides additional detail regarding the recommendation records that are retrieved for boosting scores of ads.

Figure 4:
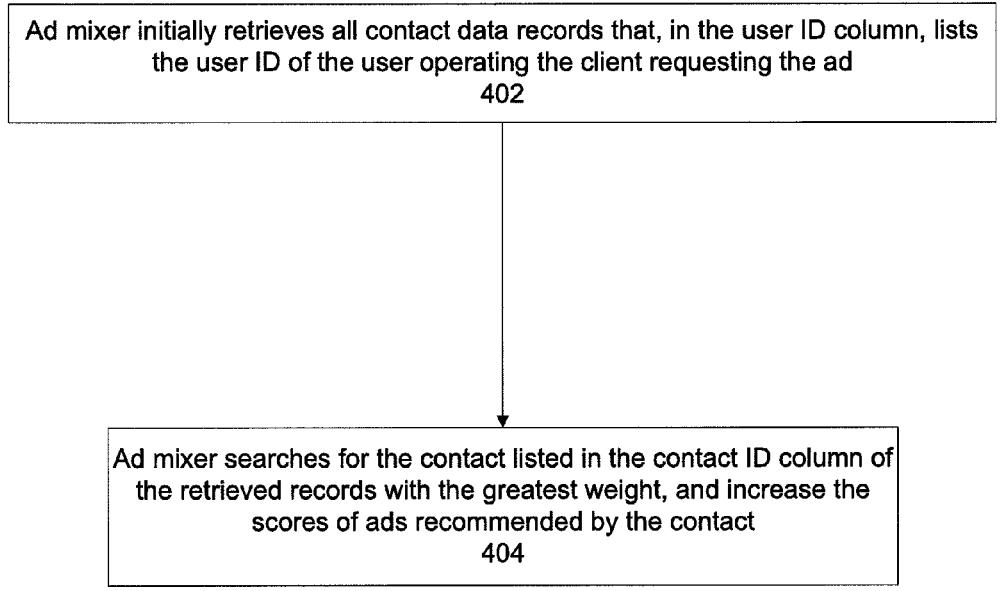
FIG. 4 is a flow diagram illustrating boosting ad scores using social data, according to an embodiment.

In step 310, ad mixer 150 computes and boosts scores for one or more ads based on the retrieved data. Ad mixer 150 uses the retrieved social data and recommendation data to boost scores of some ads. In an embodiment, ad mixer 150 may also use an index of sorted weight data in order to efficiently determine the contacts with the greatest weights. Such an index may contain pointers to social data records that contain information regarding contacts with the greatest weights. In some embodiments, ad mixer 150 may use a list of contacts sorted by weight value to determine the contacts with the greatest weights. FIG. 4 provides additional detail regarding the combination of steps 308 and 310.

In step 312, ad mixer 150 selects an ad based on boosted scores for one or more ads. Ad mixer 150 selects the ad with highest score, after boosting scores for the ads.

In step 314, ad mixer 150 sends an ad ID of the selected ad to ads server 118.

In step 316, ads server 118 prepares iframe content. Ads server 118 may iframe content that will be sent to client 101 for installation and execution.

In step 318, ads server 118 sends ad ID and the iframe content to client 101.

In step 320, client 101 receives ad ID and the iframe content, displays ad, and the iframe content executes within an inline frame on the client. The iframe code initializes after installation, and executes in order to send an annotation request to annotation server 154 and receive an annotation from the annotation server 154.

In step 322, iframe 134 sends encrypted identification information, ad ID, and request for annotation to annotation server 154. The encrypted identification information may be a limited ID cookie, a non-limited identification cookie, or some other encrypted identifier. The iframe communicates with annotation server 154 to request an annotation and receive the annotation.

Figure 8:
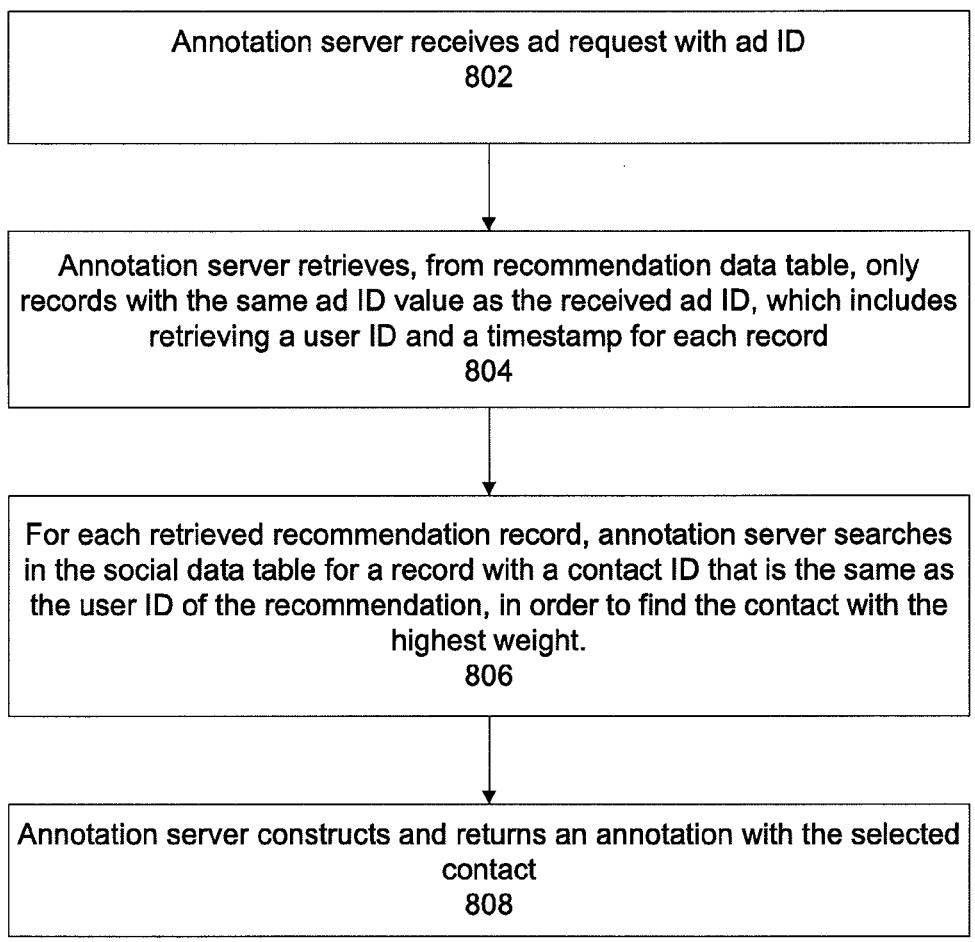
FIG. 8 is a flow diagram illustrating construction of annotation using the social data table, according to an embodiment.

In step 324, annotation server 154 constructs annotation and returns annotation to iframe 134. The steps that annotation server 154 performs to construct the annotation according to an embodiment are illustrated in FIG. 8.

In step 326, iframe 134 receives the annotation.

In step 328, client 101 displays annotation with ad. Client 101 may display the annotation on top of the ad, or client 101 may display the annotation by making the annotation a part of the ad.

Boosting One or More Ad Scores Using Social Data

FIG. 4 is a flow diagram illustrating boosting ad scores using social data, according to an embodiment. In some embodiments, ad mixer 150 may increase the score of an ad based on social data indicating that a contact and the user have greater social affinity.

In step 402, ad mixer 150 initially retrieves all contact data records that, in the user ID column, list the user ID of the user operating the client requesting the ad. By this step, ad mixer 150 filters the contacts that may be used for increasing the score of ads to only those contacts associated with the user requesting the ad.

In step 404, in some embodiments, ad mixer 150 searches for the contact listed in the contact ID column of the retrieved records with the greatest weight. In some embodiments, all of the ads that have been recommended by the contact with the greatest weight may have their ad scores increased. In other words, in such embodiments, the contact with the greatest weight has the ad scores of all of the ads that the contact has recommended increased by the weight value. For example, since Alice is the contact of Bob with a weight of 0.8 in social data record 904 that is the highest weight, both Ad1 and Ad5 in recommendation data records 1002 and 1006, respectively, have their ad scores increased by 0.8.

In some embodiments, ad mixer 150 utilizes a list of contacts sorted by weight in order to efficiently find the contact with the greatest weight. The user-contact pair with the greatest weight may be listed at the head of the list. The next user-contact pair may be of a lesser weight, and so on. The user-contact pair at the tail of the list may be of the least weight. In some embodiments, ad mixer 150 uses the user-contact pair found at the head of the list to increase one or more ad scores. In some embodiments, ad mixer 150 uses multiple user-contact pairs found towards the beginning of the list in order to increase ad scores.

In some embodiments, for each contact listed in the contact ID column of the retrieved records, ad mixer 150 increases the ad scores of all ads of the contact by an associated weight. The associated weight is listed in the same record as the contact. In other words, all of the ads associated with each contact of the user receive an ad score increase. The ads with the increased scores are now more likely to be selected to be sent to client 101 for display.

The weight value reflects the frequency of views, calls, and/or text messages between the user ID listed in the user ID column and the user ID list in the content ID column.

Additional details regarding the entry of the weight data into the social data table is discussed with respect to FIG. 3.

Figure 5A:
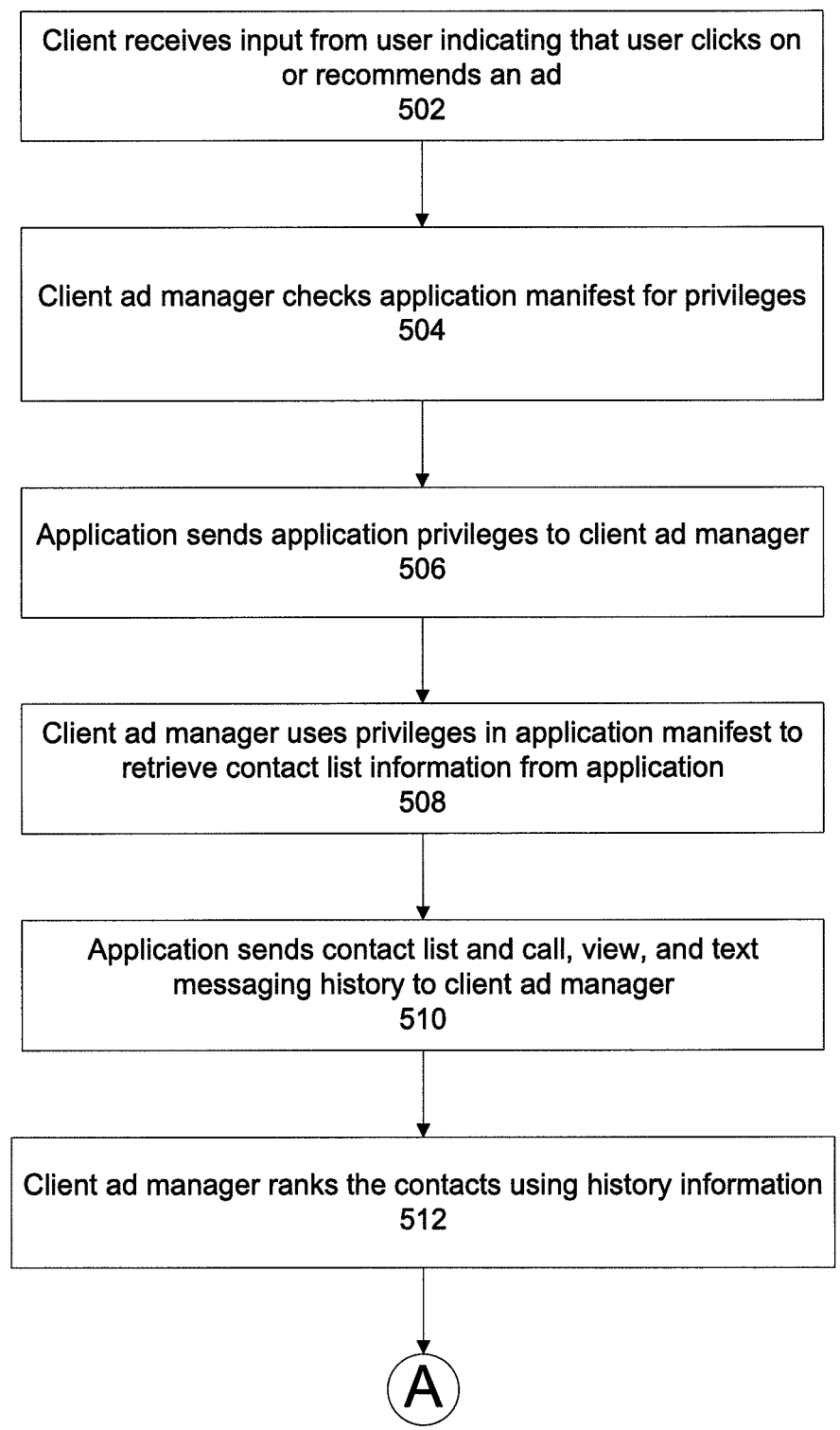
FIG. 5a and FIG. 5b together forms a flow diagram illustrating storing contact weight data after a user makes a recommendation or clicks on an ad, according to an embodiment.
Figure 5B:
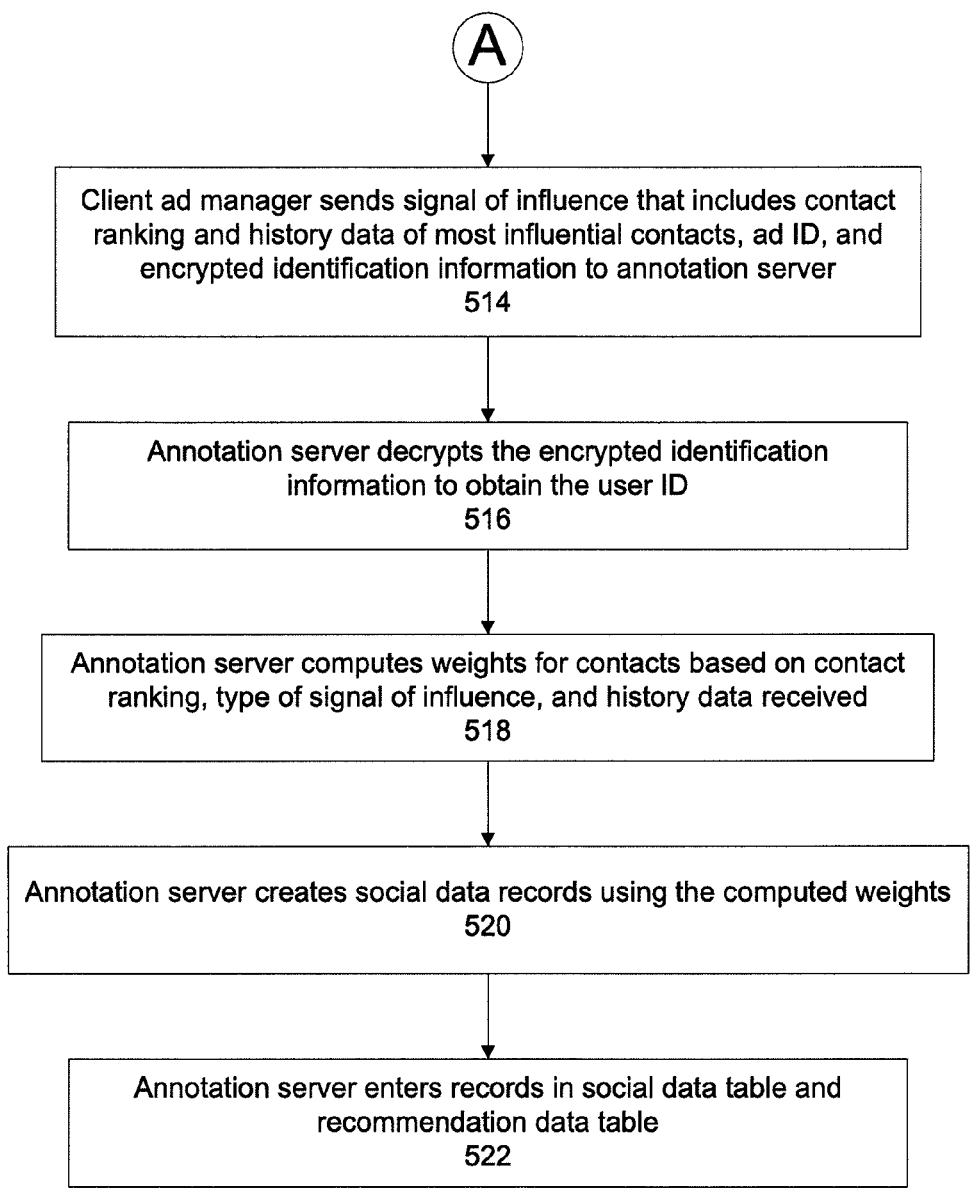

Storing Contact Weight Data after a User Makes a Recommendation or Clicks on an Ad FIG. 5a and FIG. 5b together forms a flow diagram illustrating storing contact weight data after a user makes a recommendation or clicks on an ad, according to an embodiment.

In step 502, client receives input from user indicating that user clicks on or recommends an ad. If the user sees something that is of interest in the ad, the user may click on the ad. The ad may be annotated with a friend's recommendation, in which case the user may decide that a recommendation from this friend is worthy of further investigation and decides to click on the ad. In other circumstances, if the user sees the ad, and decides that the ad is promoting something that the user likes, then the user may recommend the ad by operating a control that allows the user to recommend the ad. Such a control may be displayed with or on top of the ad.

In step 504, client ad manager 132 checks application manifest for privileges. The client ad manager checks whether the application has the requisite access privileges in order to access call, view, and text messaging history data.

In step 506, application sends application privileges to client ad manager 132. The client ad manager must receive the application privileges in order to retrieve contact and history information.

In step 508, client ad manager 132 uses privileges in the application manifest to retrieve contact list information from application. The contact list information may list friends of the user, may also include the volume and/or frequency of communications with the friends. Client ad manager 132 may retrieve communication history such as the call, view, and text messaging history.

In step 510, application sends the contact list and call, view, and text messaging history to client ad manager 132. The contact data may include the frequency of calls, texts, or views of contacts from a contact application. Such a contact application may be, for example, a personal phone book directory for a phone application.

In step 512, client ad manager 132 ranks the contacts using the history information. Client ad manager 132 may use an algorithm that ranks the contacts. In an embodiment, an algorithm may rank the contacts according to the frequency of calls made within the past three months. In another embodiment, an algorithm may rank the contacts according to the total number of times that a user spends on phone calls with each contact. In another embodiment, client ad manager 132 may use an algorithm to rank the contacts according to the most recently contacted contacts. Client ad manager 132 may use any combination of history information in order to rank the contacts.

In step 514, client ad manager 132 sends a signal of influence that includes contact ranking and the history data of the most influential contacts, ad ID, and encrypted identification information to annotation server 154. The ranking of contacts that is computed in step 512 may be sent to the annotation server 154. In some embodiments, client ad manager 132 sends only the top ranked contacts to the annotation server 154. For example, client ad manager 132 may send the top 10 ranked contacts, out of a total of 15 ranked contacts, to the annotation server 154. Client ad manager 132 may also send the history data that includes call, view, and text messaging history to annotation server 154.

In step 516, annotation server 154 decrypts the encrypted identification information to obtain the user ID. In an embodiment, ads server 118 sends a limited ID cookie to authentication validator 142 to decrypt the limited ID cookie, in order to obtain the user ID. In some embodiments, ads server 118 sends a non-limited identification cookie to a decryption server to decrypt the cookie, in order to obtain a user ID.

In step 518, annotation server 154 computes weights for contacts based on contact ranking, type of signal of influence, and history data received. The annotation server 154 may compute the weights for the contacts based on the ranking that is received from the client ad manager. In some embodiments, a contact that has a higher ranking is assigned a higher weight value. In some embodiments, a contact that has a lower ranking is assigned a lower weight value.

In some embodiments, the weight increase may be greater for certain types of signal of influence than for other types of signal of influence. For example, the weight increase for contacts that are ranked and received from the client ad manager 132 for ad recommendations may be greater than the weight increase for contacts associated with e-mail interactions.

In some embodiments, the annotation server 154 may also use call, text, and view history to compute the weights for the contacts. The annotation server 154 may use an algorithm similar to the algorithm used by the client ad manager, or the annotation server may use a different algorithm, in order to compute the weight using the history information.

In step 520, annotation server 154 creates social data records using the computed weights. Annotation server 154 uses the user ID of the user, the user ID of each contact, and the computed weight for each contact in order to create the social data record.

In step 522, annotation server 154 enters the records in the social data table and the recommendation data table.

Figure 6:
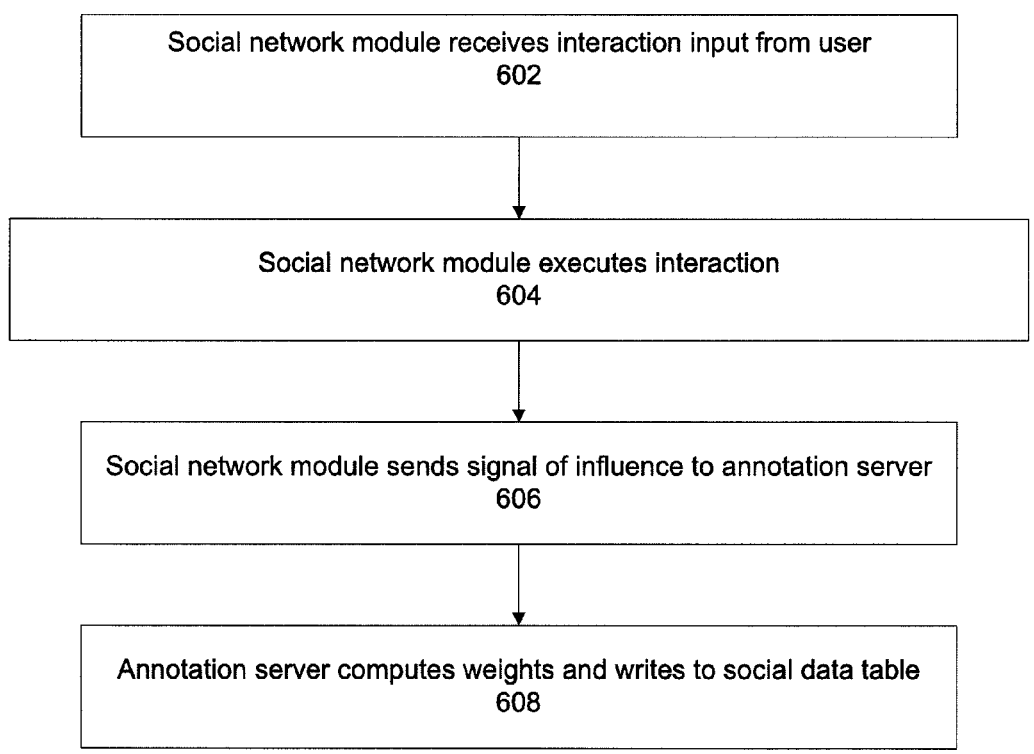
FIG. 6 is a flow diagram illustrating a social network module communicating a signal of influence to the annotation server, according to an embodiment.

Social Network Module Communicating a Signal of Influence to the Annotation Server FIG. 6 is a flow diagram illustrating a social network module communicating a signal of influence to the annotation server, according to an embodiment. The social network module may send a signal of influence to the annotation server containing data which may be used to compute weights for contacts.

In step 602, social network module 192 receives interaction input from user. The social network module may receive input from the user indicating that the user wants to perform a social networking activity. For example, the user may want to initiate a social networking conversation space. In such a social networking conversation space, the user is registered with a server. Contacts may join the user anytime to have a video, voice, or text communication with the user. Any one of the contacts may communicate with the other contacts within the social networking conversation space.

As another example, the user may want to create a social networking contact group and add a contact to the group. The user may remove a contact from a group, or move the contact between different groups. The user may share information with members of each group. The user may choose to share certain information with certain groups and not with other groups.

As another example, the user may choose to post a comment on the user's profile. Other social networking activities may also be indicated by the user through the interaction input. Not all social networking activities that are indicated by user interaction input are included in this list. In some of the embodiments, the server that the user's client device communicates with in order to perform the interactions is the annotation server.

For some social networking interaction inputs, the user might specify a contact to perform the interaction with. When an interaction input involves another contact, the weight of the contact with respect to the user may be changed depending on the nature of the social network interaction.

In step 604, social network module 192 executes the interaction. Depending on the particular social interaction, annotation server 154 performs different activities at this stage. The annotation server may read values from tables, communicate with client devices, obtain user IDs from cookies to authenticate the user and contacts, etc. The annotation server may communicate with other modules in order to successfully execute the interaction. For example, social network module 192 may perform the steps for adding a contact of the user to a user's social networking contact group. As another example, social network module 192 may perform the steps for executing a video conferencing session.

In step 606, social network module 192 sends a signal of influence to annotation server 154. Annotation server 154 uses the signal of influence to compute and update the ranking scores. In some embodiments, the signal of influence is a communication expressing that A performed X with B, with Y parameters. For example, a signal of influence may be Alice called Bob for two hours in the last week. In this example, A=Alice, X=call, B=Bob, and Y=2 hours in the last week. In an embodiment, the elements that make up the signal of influence are [source ID, destination ID, action, parameters]. Source ID is the person that performed the action. Destination ID is the recipient of the action. Action may be, for example, calling someone, sending a text message to someone, or adding someone to a social networking contact group.

In step 608, annotation server 154 computes weights and writes to the social data table. Annotation server 154 may compute the weight, or an increase to the weight, or a decrease to the weight, based on the nature of the executed interaction. Annotation server 154 may increase and/or decrease and/or set the weight value of a contact based on the activities of the user and/or the contact. In some embodiments, the annotation server 154 writes the interactions into a log, and a cron job reads from the logs and computes the weight for one or more contacts, and enters records containing the weights for contacts in the contact data table.

In an embodiment, when a user invites a contact to perform a social networking activity, the weight of the contact with respect to the user increases. For example, prior to Alice inviting Bob to perform a social networking activity, two social data records may be as follows: Bob|Alice|0.2 and Alice|Bob|0.2. After Alice invites Bob to perform the activity, the two social data records may be as follows: Bob|Alice|0.2 and Alice|Bob|0.5. When Alice extended an invitation to Bob to perform the social network activity, this shows that Bob is important to Alice. Because Bob is important to Alice, the weight of Bob with respect to Alice is increased to 0.5 from 0.2.

In order to implement some of the below embodiments, annotation server 154 may use cookies to keep count of proportions, volume and/or frequency data. The annotation server may also utilize additional tables and/or logs to implement some of the above embodiments. The annotation server may store data for the users and the contacts within the additional tables and/or logs. In some embodiments, one or more modules other than the annotation server may be used to implement some of the techniques or features described below.

In some embodiments, if the user performs a chat on a social networking chat service with a contact, then the weight of the contact may be increased. In some embodiments, if the user performs a video chat with the contact, then the increase in the weight may be greater than if the user only performs a text chat or voice call with the contact. The increase in the weight of a contact may be a function of the duration of time that the user spends in a chat with the contact. For example, if Bob chats will Alice for five hours, and only chats with Carol for 20 minutes, then the weight of Alice may be greater than the weight of Carol with respect to Bob.

In some embodiments, the weight of a contact may be higher or increased if the contact is invited to join a chat list of contacts that the user may potentially chat with. For example, if Bob sends an invitation to Alice to join Bob's chat list, then the weight of Alice may be increased. By joining Bob's chat list, Bob may be able to see whenever Alice is online and available for chat.

In some embodiments, the weight of a contact may be higher or increased if the user chooses to be notified whenever the contact is available for video, voice, or text communication. For example, Bob may indicate that Bob should be notified whenever Alice is available for communication. Alice's weight may be increased based on Bob's interest in being notified that Alice is available for communication.

The weight increase may also depend on the duration of time that the user and the contact have had each other as contacts and have continually communicated with each other. For example, if Bob has Alice as a contact for five or more years, and Bob talks to Alice every weekend for the five years, then Alice has a greater weight with respect to Bob. If Bob has Carol as a contact for five or more years, but Bob has not talked to Carol in two years, then the weight of Carol with respect to Bob may be lower. A table of the duration of communications between the user and the contact and volume and/or frequency of contact between the user and the contact may be used to determine the weight change.

In some embodiments, if the user notifies a contact that the user will be available in a social networking conversation space, then the weight of the contact may be increased. In some embodiments, the weight of a contact may be higher or increased if the user invites the contact to join a social networking conversation space. For example, if Bob creates a social networking conversation space, and Alice joins Bob's social networking conversation space, then Alice's weight increases with respect to Bob. In some embodiments, by creating the social networking conversation space, anyone that joins Bob's social networking conversation space may see Bob's availability for a conversation and/or may immediately engage in a conversation with Bob. The conversation may be performed with any combination of video, audio, and text or any other method of communication between a contact and the user. In some embodiments, anyone that joins Bob's social networking conversation space may communicate using video, audio, or text with other contacts in Bob's social networking conversation space. In some embodiments, the greater the duration of time that a contact spends in the user's social network conversation space, the greater the increase to the weight of the contact.

In some embodiments, if the user adds the contact to a social networking contact group, then the weight of the contact may be increased. The weight increase may be greater for certain social networking contact groups than for other social networking contact groups. For example, the increase in weight for a contact that is added to a social networking contact group of "best buddies" or a social networking contact group of "family members" may be much greater than the increase in weight for a contact that is added to a social networking contact group of "potential acquaintances".

In some embodiments, the user may designate which social networking contact groups are of greater importance than others. The weight increase may be greater for contacts that are added to social networking contact groups that the user has designated as more important. In some embodiments, the influence that joining a social networking contact group has on the weight of a contact may be automatically computed based on the average volume and/or frequency with which the user communicates with the contacts of the social networking contact group.

In some embodiments, the weight of a contact may be higher if the user clicks on an ad that has an annotation of a recommendation from the contact. For example, if Alice recommended an ad for a toy store by clicking on the ad for the toy store, and Bob, seeing from the annotation that Alice has recommended the toy store, clicks through on the ad, then Alice's weight may be higher with respect to Bob.

In some embodiments, the weight of a contact may change according to the volume and/or frequency that the user clicks on ads annotated with the contact's recommendations. For example, if Bob clicks on ads annotated with the words "Alice recommended this application" for more than 80% of the time that Bob views ads with such an annotation, then the weight of the contact may be set at a higher value. In some embodiments, the weight of a contact may change proportionally according to the number of times that the user clicks on ads annotated with the contact's recommendations out of all of the number of times that the user clicks on ads. For example, if Bob clicks on 20 ads in one month, and 18 of the ads that Bob clicks on have an annotation with Alice's recommendation, then Alice's weight with respect to Bob may be set at a higher value.

In some embodiments, the weight of a contact may be higher or increased if the user tags (i.e. labels the contact with an identifier) the contact in a photo. The weight of the contact may increase proportionately according to the number of images that are labeled with the contact's name by the user. The more often the user tags the contact, the greater the contact's weight may increase with respect to the user. In some embodiments, the weight of a contact may be higher or increased if the user posts a comment regarding a photo with the contact. In some embodiments, the weight of a contact increases if the contact and the user both post multiple comments regarding the same photo. The weight may increase greater if there are more comments made by the user and/or contact regarding the same photo.

In some embodiments, the weight of a contact may change according to the proportion of images that are labeled with an identifier for the contact out of the total quantity of images belonging to the user. In some embodiments, the weight of a contact may change according to the proportion of images that are labeled with an identifier for the contact out of the total quantity of images labeled by the user. Such images may be automatically labeled using a face recognition algorithm, or labeled by the user, and the proportion of images labeled with an identifier for the contact may be counted and used to determine the weight.

In some embodiments, the weight of a contact may be increased if the user plays a game with the contact or invites the contact to play a game. In some embodiments, the weight of the contact may increase proportionally according to the amount of time that both the user and the contact spend in the same game. The weight of the contact may also increase proportionally if the contact and the user participate in the same games with higher frequency.

In some embodiments, the weight of a contact may be increased if the user shares ads, photos or content with the contact. For example, if Bob shares some photos of his vacation with Alice, then the weight value for Alice with respect to Bob may be increased. As another example, if Bob shares a recipe with Alice, the weight value for Alice with respect to Bob may also be increased. The weight of a contact may be changed proportionally according to the volume and/or frequency with which the user shares ads, photos or content with the contact. In some embodiments, the weight of the contact may be decreased if the user has not shared any photo with the contact after some duration of time. In some embodiments, the weight of a contact may be changed in proportion to the percentage of sharing that is addressed to the contact out of the total quantity of sharing made by the user.

In some embodiments, the weight of a contact with respect to a user may increase if the user identifies the contact as having posted a comment and labels the contact with a name. The weight of the contact may increase proportionately according to the number of comments that are labeled with the contact's name by the user. The weight of a contact may also be set or changed based on the proportion of the contact's comments that are labeled by the user out of the total quantity of comments that have been labeled by the user.

In some embodiments, the weight of a contact may increase if the user posts a comment on the contact's profile on a social network. The weight of the contact may increase or decrease in proportion to the volume and/or frequency that a user posts comments to the contact's profile. The weight of the contact may also increase if the user makes a comment in response to the contact's post, or if the contact posts a comment in response to the user. In some embodiments, the weight of a contact may decrease if the user deletes a comment posted by the contact or if the contact deletes a comment posted by the user.

In some embodiments, the weight of a contact may change proportionally according to the number of shared contacts between the user and the contact. For example, if Bob has 10 contacts in common with Alice, and only one contact in common with Carol, then Alice's weight with respect to Bob may be greater than Carol's weight with respect to Bob.

In some embodiments, the weight of a contact may change according to the volume and/or frequency that the user and the contact recommend the same ads. For example, if Bob recommends ads for Yosemite for 90% of the time, and Alice also recommends ads for Yosemite 85% of the time, then the weight of Alice may be set at a higher value with respect to Bob.

In some embodiments, the weight of a contact with respect to a user may change depending on the date and/or time. A cookie or a data table may be used to store statistical information to identify social networking contact groups that the user clicks on more often at different times. The contacts that are part of a social networking contact group that is clicked on more often at certain times may have their weights increased during those times. For example, if Alice is in Bob's "coworker" social networking contact group, and Bob clicks on ads annotated with coworker recommendations more often during the weekdays, then Alice's weight may increase during the weekdays. As another example, if Alice is in Bob's weekend group of biking friends, and Bob tends to click on more ads that are annotated with recommendations made by Bob's group of biking friends during the weekends, then Alice's weight may be increased during the weekends.

In an embodiment, the user may designate that the contact is very important, and the weight of the contact is increased. For example, Bob may be given access to a control that allows Bob to designate the weight for Alice. Bob may set the weight for Alice very high because Bob is interested in the recommendations that are made by Alice.

In some embodiments, the weight of the contact with respect to a user may change if the user invites the contact to view a video or to visit a website. For example, if Bob invites Alice to view a video that he has made of his children, then the weight of Alice with respect to Bob may increase.

Figure 7:
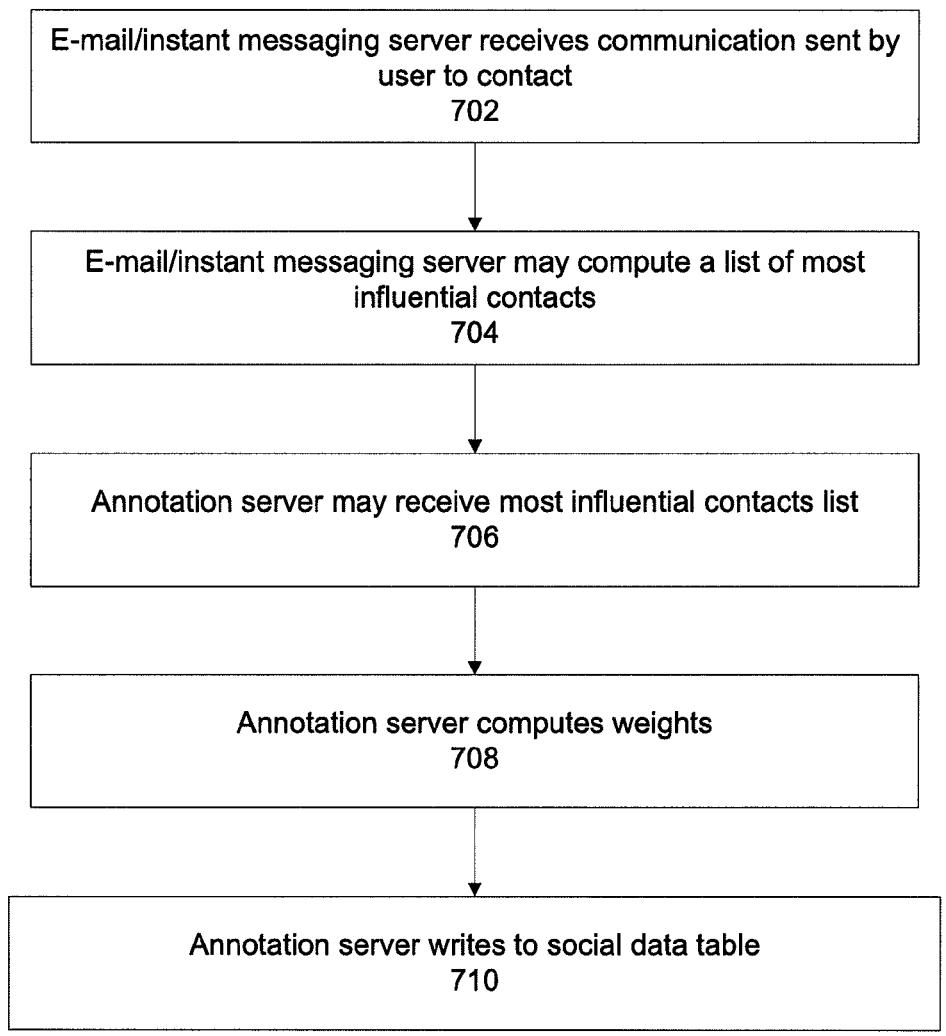
FIG. 7 is a flow diagram illustrating an email/instant messaging server communicating a signal of influence to the annotation server, according to an embodiment.

Email/Instant Messaging Server Communicating a Signal of Influence to the Annotation Server FIG. 7 is a flow diagram illustrating an email/instant messaging server communicating a signal of influence to the annotation server, according to an embodiment. The server may send a signal of influence to the annotation server which contains data that may be used to rank contacts.

In step 702, e-mail/instant messaging server 194 receives communications sent by user to contact. In some embodiments, a module is installed at an e-mail and/or instant messaging server in order to receive data about communication activity and may be used to determine the most influential contacts for the user. The module may receive influential contact data based on the e-mails or instant messages that the user sends to contacts.

Communications that are sent by the user to the contact may be noted in a table of a storage. The statistical data regarding the volume and/or frequency with which the user sends communications to the contacts may be stored. In some embodiments, the e-mail and/or instant messaging server may be modified to perform the steps performed by the module as described herein.

In step 704, e-mail/instant messaging server 194 may compute a list of most influential contacts. This step is optionally present in some embodiments. In some embodiments, the server or a module on the server may maintain a table with data that indicates which contacts the user communicates with most often, and the properties of those communications. Such properties of the communications may include the length of the e-mail, the volume and/or frequency with which the user communicates with a contact, and the other such data. The data may be analyzed statistically in order to determine the most influential contacts. The list of most influential contacts may then be sent to annotation server 154.

In step 706, annotation server 154 may receive a most influential contacts list. In some embodiments, the server or module may send a list of the most influential contacts to the annotation server. The list may be computed and sent according to different time intervals. The list may be sent after a certain volume of communications between the user and the contact has been processed.

In some embodiments, e-mail/instant messaging server 194 sends a signal of influence to annotation server 154 expressing that A performed X with B, with Y parameters. Annotation server 154 uses the signal of influence to compute and update the ranking scores. For example, a signal of influence may be Alice sent 5 e-mails to Bob last week. In this example, A=Alice, X=sent email, B=Bob, and Y=5 emails in the last week. In an embodiment, the elements that make up the signal of influence are [source ID, destination ID, action, parameters]. Source ID is the person that performed the action. Destination ID is the recipient of the action. Action may be, for example, sending an e-mail or instant message to someone. Parameters are other miscellaneous information.

In step 708, annotation server 154 computes weights. Annotation server 154 computes weights and writes to social data table. Annotation server 154 may compute the weight, or an increase to the weight, or a decrease to the weight, based on the e-mail/instant message. Annotation server 154 may increase and/or decrease and/or set the weight value of a contact based on the activities of the user and/or the contact. Annotation server 154 may also use the list of the most influential contacts to modify or compute the weight value. Annotation server 154 may increase the weight value of contacts who are higher in the list. In some embodiments, the annotation server writes the interactions into a log, and a cron job reads from the logs and computes the weight for one or more contacts, and enters records containing the weights for contacts in the contact data table.

In some embodiments, the length of an e-mail that a user sends to a contact may be used to change the weight between the user and the contact. For example, a long e-mail may tend to indicate that the e-mail is of a commercial variety, and the weight between the user and the contact may be decreased. Short e-mails are usually specially prepared by the user for a contact, and the weight of the contact with respect to the user may be increased. Whether the weight is increased or decreased depending on the length of e-mails is a policy that may be set by an administrator.

The volume and/or frequency of e-mail and/or instant messaging communications between the user and the contact may also be used to change the weight. If the user sends communications often to the contact, then the weight of the contact with respect to the user may be increased. For example, if Bob and Alice are always communicating using the instant messaging service, then the weight between Bob and Alice may be increased.

The number of other people that also receive a copy of an e-mail sent to a contact may also be used to change the weight. In some embodiments, the weight is set at a higher value if fewer people also receive a copy of the e-mail sent to a contact. In some embodiments, the weight is set at a lower value between the user and the contact if a greater number of people also receive a copy of the e-mail sent from the user to the contact. For example, if the contact is part of an e-mail list, then large numbers of people may receive the e-mail, and therefore the weight between the user and the contact is not increased. If the user only sends messages that have a single recipient to the contact, then the weight between the user and the contact may be increased, as such e-mails tend to be more personal or specifically directed at the contact.

In some embodiments, if the user sends attachments or transmits a file to a contact, then the weight of the contact with respect to the user may also be increased. For example, if Bob sends an e-mail with pictures attached to Alice, then the weight of Alice with respect to Bob may be increased.

In some embodiments, the weight of a contact with respect to user decreases over time if the user does not send communications to the contact for a duration of time. For example, if Bob does not send e-mails to Alice for a year, then the weight of Alice decreases.

In step 710, annotation server 154 writes to social data table. Annotation server 154 may construct a social data record that includes the user's user ID, the user ID for the contact, and also the weight computed for the contact. The record is entered into the social data table.

Construction of Annotation Using Social Data Table

FIG. 8 is a flow diagram illustrating construction of annotation using the social data table, according to an embodiment.

In step 802, annotation server 154 receives an annotation request with an ad ID. Since the ad to be displayed to the user has been selected by ad mixer 150, the annotation server's task in constructing the annotation is to construct an annotation that is appropriate for the selected ad.

In step 804, annotation server 154 retrieves, from recommendation data table 153, only records with the same ad ID value as the received ad ID, which includes retrieving a user ID and a timestamp for each record. Annotation server 154 uses the user ID to communicate, in the annotation, which contact recommended the ad associated with the ad ID. The timestamp indicates when the contact made the recommendation.

In some embodiments, the weight that is computed for a contact ID is lower if the timestamp is from a more distant past. Records with timestamps that are from a more distant past may cause the weight computation to result in a lower score than records with more recent timestamps. For example, if Bob went to ABC market three months ago, and Alice went to ABC market one month ago, then the weight giving to Bob may be lower than the weight given to Alice.

In some embodiments, the annotation does not indicate any date or time if the timestamp is irrelevant. For example, if the timestamp is more than one year old, then an annotation may only indicate that a contact has visited a location, without indicating the date or time that the contact visited the location.

In step 806, for each retrieved recommendation record, annotation server 154 searches in the social data table for a record with a contact ID that is the same as the user ID of the recommendation, in order to find the contact with the highest weight. The weight of the contact ID is compared against the weight of other contact IDs. The contact with the highest weight value is used in constructing the annotation. For example, if Bob is the user that requested an ad, then record 904 is retrieved. Record 904 shows that Alice is a contact of Bob with a weight of 0.8. Record 1002 in recommendation table 1000 shows that Alice has recommended Ad1. By combining social data record 904 and recommendation data record 1002, annotation server 154 computes that Alice has the highest weight, and therefore Alice's social data and recommendation data is used to construct the annotation. In some embodiments, annotation server 154 selects multiple contacts with the highest weights for constructing the annotation. In some embodiments, in the event that two contacts have the same weight, the contact(s) that are selected for use in annotation may be randomly selected.

In some embodiments, annotation server 154 utilizes a list of contacts sorted by weight in order to efficiently find the contact with the greatest weight. The user-contact pair with the greatest weight may be listed at the head of the list. The next user-contact pair may be of a lesser weight, and so on. The user-contact pair at the tail of the list may be of the least weight. In some embodiments, annotation server 154 uses the user-contact pair found at the head of the list to construct an annotation. In some embodiments, annotation server 154 uses multiple user-contact pairs found towards the beginning of the list in order to construct the annotation.

In step 808, annotation server 154 constructs and returns an annotation with the selected contact. In an embodiment, the annotation constructed may be of the form user name+ "recommended this application". For example, if Alice is the contact that is selected for the annotation, then the annotation may be "Alice recommended this application".

Social Data Table

FIG. 9 illustrates a social data table, according to an embodiment. The illustrated example social data table 900 of FIG. 9 contains records 902, 904, 906, and 908 that indicate contacts of users. Social data table 900 is an example of social data table 152. A User ID column 910 in the social data table 900 lists a user ID that indicates the person with a contact (i.e. friend). For simplicity of illustration, in FIG. 4, the name of the users and/or contacts are illustrated instead of the user IDs. A Contact ID column 912 in the social data table 900 lists a user ID of a contact. For each record, in social data table 900, the user ID of the person listed in the contact ID column is the contact (i.e. friend) of the person listed in the user ID column. A weight column 914 indicates, for each record, the weight that has been assigned to the relationship between the contact in the contact ID column and the user in the user column.

Annotation server 154 retrieves one or more of the records from social data table 900 to boost the scores of ads in ad scoring. For example, if Alice's client device submitted an ad request, annotation server 154 may boost the score of an ad that has been recommended by Bob by 0.8, based on record 902. After boosting the score, ad mixer 150 may be more likely to select the ad with the boosted score to send back to Alice's client device for viewing.

In one embodiment, the weight value may be between 0 and 1. For example, as depicted in record 902, the weight of Bob with respect to Alice is 0.8, which may be considered a high weight value. In social data record 904, the weight of Alice with respect to Bob is 0.8. In social data record 906, the weight of Carol with respect to Alice is 0.5, which may be considered a medium weight value. In other embodiments, the weight value may be any number value.

In some embodiments, as described in this specification, social data table 900 may be populated using a signal of influence received from an e-mail/instant messaging server. In some embodiments, as described in this specification, social data table 900 may be populated using a signal of influence received from a social network module. In some embodiments, as described in this specification, social data table 900 may be populated using a ranking of contacts and other information. In some embodiments, social data table 900 may be populated using call, text message, and view history information. Such information may be received from the client ad manager. Additional information regarding populating social data table 900 using history and contact information is described below.

Social data table 900 may be populated by the front end module or ads server 118 decrypting call, text message, and view history information received from the client ad manager 132, and writing the decrypted information into a log file. The call information may be the volume and/or frequency of occurrences where the user and/or the contact calls the other on the phone. The text message information may be the volume and/or frequency of occurrences where the user and/or the contact send text messages to the other.

The view history information may be the frequency and/or the volume of occurrences where the user views the information of the contact.

A cron job and/or ads server and/or annotation server and/or other module can use call, text, and/or view history data and compute weights for entering records into the social data table. In an embodiment, if the user calls the contact often, then the weight value of the contact may be set at a higher value according to some formula. If the user does not call the contact often, then the weight value of the contact may be set at a lower value. For example, if the user calls the contact every day, then the weight value may be set at 0.9. If the user calls the contact only once a month, then the weight value may be set at 0.3. In some embodiments, if the user has very lengthy conversations with the contact, then the weight is also increased accordingly. For example, if Bob calls Alice and talks to Alice every day for a few hours, then the weight between Alice and Bob can be set to 0.8, which is a higher value that reflects the greater social affinity between Bob and Alice. In some embodiments, weight values are between 0 and 1. In other embodiments, the weight values may be any positive or negative integer. In yet other embodiments, the weight value may be any numeric value.

In some embodiments, if a first person calls a second person very often, but the second person does not reciprocate and almost never calls the first person, then the weight values may be different between the first person and the second person. For example, if only Alice calls Carol and Carol does not call Alice, then, for Alice, the weight with Carol in a contact ID column may be a midlevel value such as 0.5 as shown in the social data record 906. In other words, the weight of contact Carol with respect to user Alice is 0.5, as shown in social data record 906. In contrast, Carol does not call Alice, and therefore the weight with Alice in a contact ID column may be only 0.2, as shown in social data record 908. In other words, the weight of contact Alice with respect to user Carol is 0.2, as shown in social data record 908.

In an embodiment, if the user sends text messages to the contact often, then the weight value for the contact may be set at a higher value, such as 0.9. If the user does not send text messages to the contact very often, then the weight value of the contact may be set at a lower value, such as 0.2. In some embodiments, if a first person sends a text message to a second person very often, but the second person does not reciprocate by sending back text messages, then the weight values may be different between the first person and the second person. For example, if only Bob sends text messages to Alice and Alice does not send text messages to Bob, then, for Bob, the weight with Alice in the contact ID column is a high value such as 0.7. However, for Alice, the weight with Bob in a contact ID column is only 0.1.

In an embodiment, if the user views a contact profile of the contact often, then the weight value of the contact may be set at a higher value, such as 0.9. If the user almost never views the contact profile of the contact, then the weight value of the contact may be set at a lower value, such as 0.1.

In some embodiments, a system administrator may set the policy that calls are valued more than text messages, because when a user calls a contact, it means that the user cares enough about the contact to spend some time on a telephone conversation with the contact. A system administrator may set the policy that text messages are not weighted as highly as voice calls, because the user most likely just wants to avoid a conversation, and instead send a succinct message to the contact. It is likely that a short, to the point, text message to the contact indicates that the user simply wants to communicate the message without engaging in an extended conversation. For example, if Bob calls Alice very often, then the weight value for Alice as a contact may be 0.8. However, if Bob sends text messages to Alice without ever calling Alice, then the weight value for Alice as a contact may be only 0.2.

In some embodiments, a person is assigned a weight just because the person is in a user's contact list. As an example, ads server 118 may enter a weight of 0.8 for a contact if the contact is listed in the user's contact list from a phone contacts application. A contact list is a list of friends of the user, and each person listed in the contact list may have the weight of 0.8 assigned in the social data table. Thus, if Bob is in Alice's contact list, then, in the example embodiment, Bob has a weight of 0.8. Ads server 118 may enter the user ID for "Alice" as the user ID, Bob's user ID as the contact ID, and a weight of 0.8 for Bob. If the contact is already in the social data table 92, then ads server 118 may overwrite the record for the contact with an updated weight value.

Recommendation Data Table

FIG. 10 illustrates a recommendation data table, according to an embodiment. The illustrated example recommendation data table 1000 of FIG. 10 contains records 1002, 1004, 1006, 1008, and 1010 that indicate which users have recommended which advertisements. Recommendation data table 1000 is an example of recommendation data table 153. In an embodiment, the recommendation data table 1000 may include records associated with any recommendation made by anyone. The recommendation data table 1000 may be populated by ads server 118 whenever anyone makes a recommendation for an ad. A User ID column 1012 in the recommendation data table 1000 lists a user ID that indicates the person that has recommended the ad. For simplicity of illustration, in FIG. 10, the name of the user is illustrated instead of the user ID. An Ad ID column 1014 in the recommendation data table 1000 lists an ad ID that indicates the ad recommended by the person. Annotation server 154 retrieves the records from recommendation data table 1000 to construct annotations indicating that contacts of users have recommended ads. For example, annotation server 154 may retrieve records 1008 and 1010 from FIG. 10 which indicate that Fred has recommended Ad3 and that Kirk has recommended Ad2, respectively.

Example of Boosting Ads in Response to Ad Request Using Most Influential Contact Data In one example illustrative, Alice is in San Jose viewing a webpage, and sees an advertisement. The advertisement includes a recommendation control. Alice likes what she sees on the advertisement and clicks on the recommendation control to recommend the advertisement. Alice is operating a client device, such as client 101. A client ad manager may retrieve a cookie, such as the limited ID cookie or some other encrypted identification information stored in client 101. The client ad manager may send a list of Alice's contacts, the ad ID of the ad that Alice clicked on, the encrypted identification information, and Alice's encrypted call, text message, and view history to an ads server, such as ads server 118.

The ads server may receive the sent data, decrypt the data, and write the data into a log file. A cron job may read the history log and compute weights for creating records that are entered into the social data table, such as record 904 of FIG.

9. Alice and Bob may talk on the phone every day. Because of the frequent conversations between Alice and Bob, the cron job may compute a high weight value for Alice and Bob. For example, the cron job might enter a weight value of 0.8 for the relationship between Alice and Bob. In some embodiments, the cron job might enter different weight values depending on whether Alice's user ID is in the user ID column or Bob's user ID is in the user ID column. The ads server may create a social data record for entering into social data table. Such a social data record may be record 904 of FIG. 9. In some embodiments, the ads server may also enter a social data record such as record 902 of FIG. 9. The ads server may also create a recommendation data record for entering into the recommendation table, such as record 1002 of FIG. 10. The ads server may then enter the created records into their respective tables.

Later, Bob is in San Jose and is operating his client device, which is another example of client 101. Bob downloads and installs an application that displays advertisements, and then executes the application. A client ad manager that is part of the application, upon execution, may send an ad request to an ad server, such as ad server 118. The ad request may also include Bob's call, view, and text message history and encrypted identification information. The ads server may save Bob's history information in a storage location. The ads server or another component, such as a cron job, may create social data records for entry into social data table. Such a social data entry may be record 904 of FIG. 9. The ads server may also send the encrypted identification information to an authentication validator, such as authentication validator 142. The authentication validator 142 returns a user ID for Bob to the ads server. The ads server may send an ad request to an ad mixer, such as ad mixer 150. The ad mixer may search through a social data table, such as social data table 152, for a social contact that has the greatest weight for Bob. The ad mixer may find that the contact that has the greatest weight for Bob is Alice.

The ad mixer may increase the ad score for all of Alice's recommendations by the weight value. If the original score all of an ad is 0.1, a weight value of 0.8 might be added to the original score, for a total ad score value of. Such ads that have their ad scores increased might be Ad1 and Ad5 of record 1002 in FIG. 10. Next, the ad mixer may select an ad based on the scores of ads. If the ad associated with the ad ID of Alice's recommendation has the highest ad score, then the ad mixer selects the ad. Ad mixer 150 sends the ad ID of the ad to the ads server. The ads server sends the ad ID and iframe content to the client. The client may display the ad or wait to receive the annotation before displaying the ad. The iframe content executes to request an annotation from an annotation server, such as annotation server 154. The annotation server receives a user ID from the iframe content executing on the client.

In order to construct an annotation for the client, the annotation server may initially retrieve all records from recommendation data table with the same ad ID as the ad ID received from the client. The annotation server may search in the social data table for the contact with the highest weight. The annotation server may construct the annotation using the contact with the highest weight. The annotation server in this example may determine that Alice has the highest weight of 0.8 for Bob, based on the record 904 of FIG. 9. In this example, the annotation server may construct the annotation "Alice has recommended this application". The annotation server sends the annotation to the client. Bob's client device receives the annotation, and displays the annotation with or on top of the ad.

Other Content

Although embodiments of the invention are described herein for serving advertisements, the techniques described herein may also apply for serving any content. The techniques described herein may be used to construct annotations and serve the annotations with any content. The annotations may be displayed with or on top of the content. Such content may be, for example, any written or video advertisement for a pizza, a movie advertisement, an entertainment program, a video, a news story, pictures, a written report, an analysis or report of some data, or any other content.

Opt Out/Opt in

In some embodiments, users may optionally opt out of being served ads and the annotations using the techniques described herein. Contacts may also opt out of influencing the ads or annotations that are served to users. Contacts or users may also choose to opt out of allowing specific social network interactions to affect the ads or annotations that are served. The contacts or users may also choose to opt out of allowing e-mail or instant messaging communications or phone communications or phone directory information to affect the ads or annotations that are served.

Example Embodiments

Figure 11:
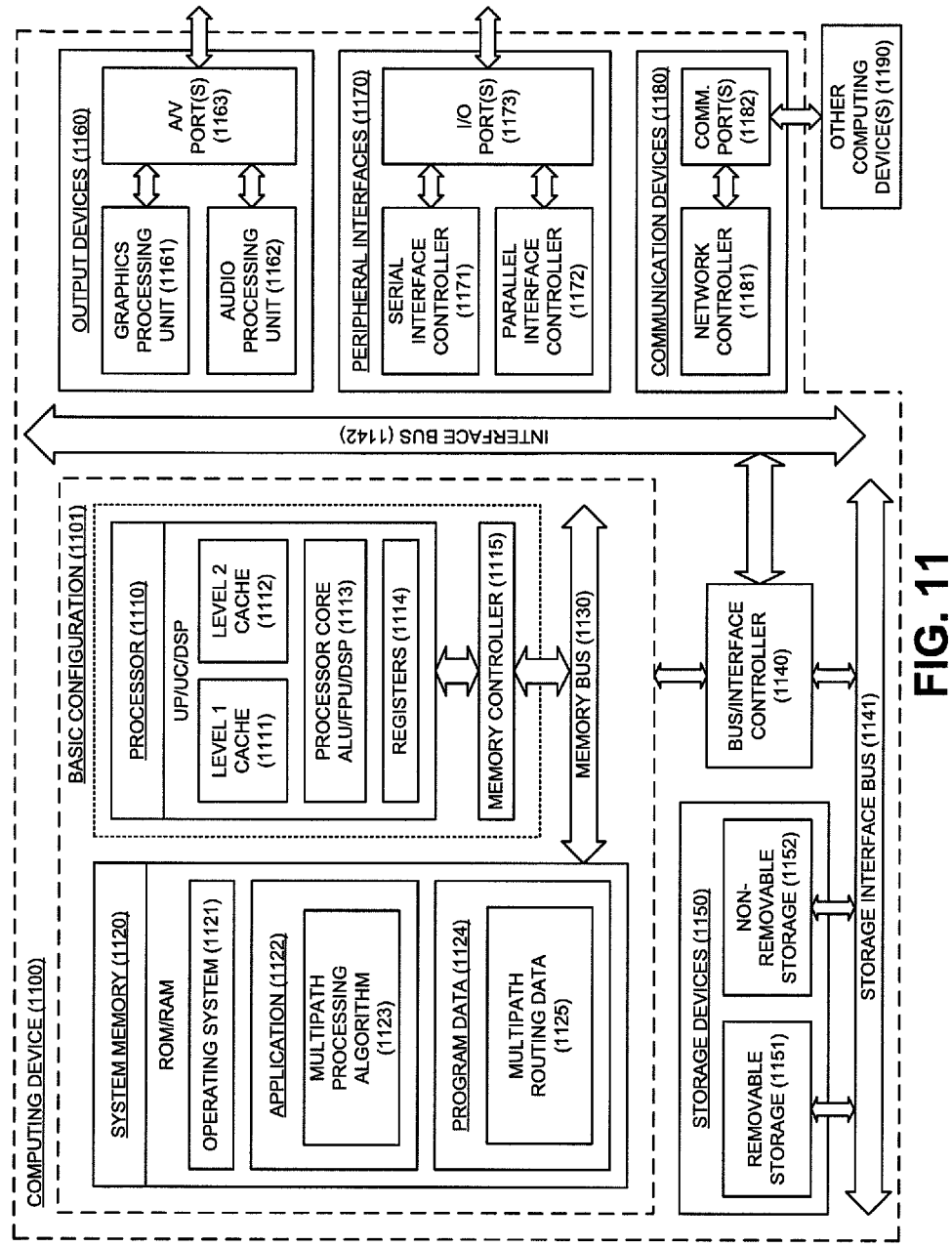
FIG. 11 is a block diagram illustrating another exemplary system upon which embodiments may be implemented.

FIG. 11 is a block diagram illustrating another exemplary system 1100 upon which embodiments may be implemented. For example, ads server 118, annotation server 154, ad mixer 150, and authentication validator 142 may be implemented with system 1100. In a very basic configuration 1101, computing device 1100 typically includes one or more processors 1110 and system memory 1120. A memory bus 1130 can be used for communicating between the processor 1110 and the system memory 1120.

Depending on the desired configuration, processor 1110 can be of any type including but not limited to a microprocessor (µP), a microcontroller (µC), a digital signal processor (DSP), or any combination thereof. Processor 1110 can include one more levels of caching, such as a level one cache 1111 and a level two cache 1112, a processor core 1113, and registers 1114. The processor core 1113 can include an arithmetic logic unit (ALU), a floating point unit (FPU), a digital signal processing core (DSP Core), or any combination thereof. A memory controller 1115 can also be used with the processor 1110, or in some implementations the memory controller 1115 can be an internal part of the processor 1110.

Depending on the desired configuration, the system memory 1120 can be of any type including but not limited to volatile memory (such as RAM), non-volatile memory (such as ROM, flash memory, etc.) or any combination thereof. System memory 1120 typically includes an operating system 1121, one or more applications 1122, and program data 1124. In some embodiments, application 1122 can be arranged to operate with program data 1124 on an operating system 1121. This described basic configuration is illustrated in FIG. 3 by those components within dashed line 1101.

Computing device 1100 can have additional features or functionality, and additional interfaces to facilitate communications between the basic configuration 1101 and any required devices and interfaces. For example, a bus/interface controller 1140 can be used to facilitate communications between the basic configuration 1101 and one or more data storage devices 1150 via a storage interface bus 1141. The data storage devices 1150 can be removable storage devices 1151, non-removable storage devices 1152, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 1120, removable storage 1151 and non-removable storage 1152 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1100. Any such computer storage media can be part of device 1100.

Computing device 1100 can also include an interface bus 1142 for facilitating communication from various interface devices (e.g., output interfaces, peripheral interfaces, and communication interfaces) to the basic configuration 1101 via the bus/interface controller 1140. Example output devices 1160 include a graphics processing unit 1161 and an audio processing unit 1162, which can be configured to communicate to various external devices such as a display or speakers via one or more A/V ports 1163. Example peripheral interfaces 1170 include a serial interface controller 1171 or a parallel interface controller 1172, which can be configured to communicate with external devices such as input devices (e.g., keyboard, mouse, pen, voice input device, touch input device, etc.) or other peripheral devices (e.g., printer, scanner, etc.) via one or more I/O ports 1173. An example communication device 1180 includes a network controller 1181, which can be arranged to facilitate communications with one or more other computing devices 1190 over a network communication via one or more communication ports 1182. The communication connection is one example of a communication media.

Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 1100 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1100 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Exemplary embodiments are shown and described in the present disclosure. It is to be understood that the embodiments are capable of use in various other combinations and environments and are capable of changes or modifications within the scope of the inventive concept as expressed herein. Some such variations may include using programs stored on non-transitory computer-readable media to enable computers and/or computer systems to carry our part or all of the method variations discussed above. Such variations are not to be regarded as departure from the spirit and scope of the invention, and all such modifications as would be obvious to one skilled in the art are intended to be included within the scope of the following claims:

The invention claimed is:

1. An apparatus, comprising:
one or more processors,
a computer-readable medium coupled to said one or more processors having instructions stored thereon that, when executed by said one or more processors, cause said one or more processors to perform operations comprising:
storing a plurality of ads in one or more ad databases;
receiving, from a client device associated with a user, data indicating a social networking action between the user and a first person who is a social network contact of the user from a plurality of persons who are social network contacts of the user, wherein the social networking action includes interaction with an ad annotated with a comment from the first person;
updating a weight value for the first person with respect to the user based on the social networking action indicated by the received data, wherein the weight value for the first person is increased as a frequency with which the user interacts with ads annotated with comments from the first person increases;
storing the updated weight value for the first person with respect to the user in a table containing stored weight values for a plurality of social network contacts of the user with respect to the user;
ranking the plurality of social network contacts of the user based on the updated weight value for each of the social network contacts, wherein the updated weight value for each of the social network contacts is based on a frequency with which the user interacts with ads annotated with comments from each of the plurality of social network contacts;
receiving an ad request from the client device associated with the user;
adjusting ad scores of candidate ads selected from the stored plurality of ads to serve to the user in response to the ad request based on the updated weight values for the plurality of social network contacts of the user stored in the table;
selecting one of the candidate ads based on the adjusted ad scores of the candidate ads;
identifying a subset of the plurality of social network contacts that have interacted with the selected candidate ad;
determining a social network contact of the user that is a highest ranked social network contact in the subset of the plurality of social network contacts;
constructing an annotation using information about one or more interactions with the selected candidate ad performed by the social network contact of the user that is the highest ranked social network contact in the subset of the plurality of social network contacts and the selected candidate ad;
visually modifying the selected candidate ad using the constructed annotation to produce an instance of the selected candidate ad for presentation to the user; wherein visually modifying the selected candidate ad using the constructed annotation is performed after the ad request is received from the client device; and
serving the instance of the selected candidate ad that has been produced by visually modifying the selected candidate ad using the constructed annotation to the client device associated with the user for display.

2. The apparatus of claim 1, wherein said computer-readable medium coupled to the one or more processors has further instructions stored thereon that, when executed by the one or more processors, cause the one or more processors to perform further operations comprising:
determining that the social networking action is the user selecting an ad with an annotation indicating that the social network contact has recommended said ad; and
based upon said determining, changing the weight of the social network contact with respect to the user.

3. The apparatus of claim 1, wherein constructing the annotation using information about the social network contact further comprises constructing the annotation by adding information about one or more additional social network contacts from the ranked plurality of social network contacts.

4. An apparatus, comprising:
one or more processors,
a computer-readable medium coupled to said one or more processors having instructions stored thereon that, when executed by said one or more processors, cause said one or more processors to perform operations comprising:
storing a plurality of ads in one or more ad databases;
receiving, from a client device associated with a user, data indicating that the user is communicating with a contact of the user from a plurality of contacts of the user;
computing a weight value for the contact with respect to the user based on the communication indicated by the received data, wherein the weight value for the contact is increased as a frequency with which the user interacts with ads annotated with comments from the social network contact increases;

entering the computed weight value for the contact with respect to the user in a table containing stored weight values for a plurality of contacts of the user with respect to the user;

ranking the plurality of contacts of the user based on the weight value for each of the contacts, wherein the weight value for each of the contacts is based on an interaction level between each of the contacts and the user;

receiving an ad request from the client device associated with the user;

increasing ad scores of one or more ads associated with the contact based on the computed weight value for the contact with respect to the user;

selecting an ad based on the increased ad scores of the one or more ads;

identifying a subset of the plurality of contacts that have interacted with the selected candidate ad;

determining a contact of the user that is a highest ranked contact in the subset of the plurality of contacts;

constructing an annotation using information about one or more interactions with the selected candidate ad performed by the contact of the user that is the highest ranked contact in the subset of the plurality of contacts and the selected candidate ad;

visually modifying the selected candidate ad using the constructed annotation to produce an instance of the selected candidate ad for presentation to the user; wherein visually modifying the selected candidate ad using the constructed annotation is performed after the ad request is received from the client device; and serving the instance of the selected candidate ad that has been produced by visually modifying the selected candidate ad using the constructed annotation to the client device associated with the user for display.

5. The apparatus of claim 4, wherein the computer-readable medium coupled to the one or more processors has further instructions stored thereon that, when executed by the one or more processors, cause the one or more processors to perform further operations comprising:

storing data indicating a frequency and/or volume of communications between the user and said contact; and computing the weight value using the data.

6. A method comprising:

receiving at a server, from a client device associated with a user, data indicating a social networking action between the user and a first person who is a social network contact of the user from a plurality of persons who are social network contacts of the user, wherein the social networking action includes interaction with an ad annotated with comment a comment from the first person;

updating a weight value for the first person with respect to the user based on the social networking action indicated by the received data, wherein the weight value for the first person is increased as a frequency with which the user interacts with ads annotated with comments from the first person increases;

storing the updated weight value for the first person with respect to the user in a table containing stored weight values for a plurality of social network contacts of the user with respect to the user;

ranking the plurality of social network contacts of the user based on the updated weight value for each of the social network contacts, wherein the updated weight value for each of the social network contacts is based on a frequency with which the user interacts with ads annotated with comments from each of the plurality of social network contacts;

receiving at the server an ad request from the client device associated with said user;

adjusting ad scores of candidate ads selected from the stored plurality of ads to serve to the user in response to the ad request based on the updated weight values for the plurality of social network contacts of the user stored in the table;

selecting one of the candidate ads based on said adjusted ad scores of the candidate ads;

identifying a subset of the plurality of social network contacts that have interacted with the selected candidate ad;

determining a social network contact of the user that is a highest ranked social network contact in the subset of the plurality of social network contacts;

constructing an annotation using information about one or more interactions with the selected candidate ad performed by the social network contact of the user that is the highest ranked social network contact in the subset of the plurality of social network contacts and the selected candidate ad;

visually modifying the selected candidate ad using the constructed annotation to produce an instance of the selected candidate ad for presentation to the user; wherein visually modifying the selected candidate ad using the constructed annotation is performed after the ad request is received from the client device; and serving the instance of the selected candidate ad that has been produced by visually modifying the selected candidate ad using the constructed annotation to the client device associated with the user for display.

7. The method of claim 6, further comprising:

determining that the social networking action is the user selecting an ad with an annotation indicating that the social network contact has recommended said ad; and based upon said determining, changing the weight of the social network contact with respect to the user.

8. The method of claim 6, wherein constructing the annotation using information about the social network contact further comprises constructing the annotation by adding information about one or more additional social network contacts from the ranked plurality of social network contacts.

9. A method comprising:

receiving at a server, from a client device associated with a user, data indicating that the user is communicating with a contact of the user from a plurality of contacts of the user;

computing a weight value for the contact with respect to the user based on the communication indicated by the received data, wherein the weight value for the contact is increased as a frequency with which the user interacts with ads annotated with comments from the social network contact increases;

entering the computed weight value for the contact with respect to the user in a table containing stored weight values for a plurality of contacts of the user with respect to the user;

ranking the plurality of contacts of the user based on the weight value for each of the contacts, wherein the weight value for each of the contacts is based on an interaction level between each of the contacts and the user;

receiving an ad request from the client device associated with the user;

increasing ad scores of one or more ads associated with the contact based on the computed weight value for the contact with respect to the user;

selecting an ad based on the increased ad scores of the one or more ads;

identifying a subset of the plurality of contacts that have interacted with the selected candidate ad;

determining a contact of the user that is a highest ranked contact in the subset of the plurality of contacts;

constructing an annotation using information about one or more interactions with the selected candidate ad performed by the contact of the user that is the highest ranked contact in the subset of the plurality of contacts and the selected candidate ad;

visually modifying the selected candidate ad using the constructed annotation to produce an instance of the selected candidate ad for presentation to the user; wherein visually modifying the selected candidate ad using the constructed annotation is performed after the ad request is received from the client device; and serving the instance of the selected candidate ad that has been produced by visually modifying the selected candidate ad using the constructed annotation to the client device associated with the user for display.

10. The method of claim 9, further comprising:

storing data indicating a frequency and/or volume of communications between the user and the contact; and computing the weight value using the data.

11. The apparatus of claim 1, the operations further comprising:

receiving another ad request from another client device associated with another user;

identifying the selected candidate ad for presentation to the another user on the another client device;

constructing another annotation using information about one or more interactions between a contact of the another user and the selected candidate ad;

visually modifying the selected candidate ad using the constructed another annotation to produce a second instance of the selected candidate ad for presentation to the another user; wherein visually modifying the selected candidate ad using the constructed another annotation is performed after the another ad request is received from the another client device; and serving the second instance of the selected candidate ad that has been produced by visually modifying the selected candidate ad using the constructed another annotation to the another client device associated with the another user for display.

12. The apparatus of claim 4, the operations further comprising:

receiving another ad request from another client device associated with another user;

identifying the selected candidate ad for presentation to the another user on the another client device;

constructing another annotation using information about one or more interactions between a contact of the another user and the selected candidate ad;

visually modifying the selected candidate ad using the constructed another annotation to produce a second instance of the selected candidate ad for presentation to the another user; wherein visually modifying the selected candidate ad using the constructed another annotation is performed after the another ad request is received from the another client device; and serving the second instance of the selected candidate ad that has been produced by visually modifying the selected candidate ad using the constructed another annotation to the another client device associated with the another user for display.

13. The method of claim 6, further comprising:

receiving another ad request from another client device associated with another user;

identifying the selected candidate ad for presentation to the another user on the another client device;

constructing another annotation using information about one or more interactions between a contact of the another user and the selected candidate ad;

visually modifying the selected candidate ad using the constructed another annotation to produce a second instance of the selected candidate ad for presentation to the another user; wherein visually modifying the selected candidate ad using the constructed another annotation is performed after the another ad request is received from the another client device; and serving the second instance of the selected candidate ad that has been produced by visually modifying the selected candidate ad using the constructed another annotation to the another client device associated with the another user for display.

14. The method of claim 9, further comprising:

receiving another ad request from another client device associated with another user;

identifying the selected candidate ad for presentation to the another user on the another client device;

constructing another annotation using information about one or more interactions between a contact of the another user and the selected candidate ad;

visually modifying the selected candidate ad using the constructed another annotation to produce a second instance of the selected candidate ad for presentation to the another user; wherein visually modifying the selected candidate ad using the constructed another annotation is performed after the another ad request is received from the another client device; and serving the second instance of the selected candidate ad that has been produced by visually modifying the selected candidate ad using the constructed another annotation to the another client device associated with the another user for display.

* * * * *